US012221245B2

(12) United States Patent
Antipin et al.

(10) Patent No.: US 12,221,245 B2
(45) Date of Patent: Feb. 11, 2025

(54) HIGH STRENGTH TRANSPARENT GLASS-CERAMIC CONTAINERS

(71) Applicant: CORNING INCORPORATED, Corning, NY (US)

(72) Inventors: Nikolai Aleksandrovich Antipin, Vsevologsk (RU); Qiang Fu, Painted Post, NY (US); Petr Gorelchenko, Painted Post, NY (US); Aniello Mario Palumbo, Painted Post, NY (US); Michael S Pambianchi, Madison, NJ (US); Erick Franklin VanDuyne, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 1139 days.

(21) Appl. No.: 16/968,382

(22) PCT Filed: Feb. 19, 2018

(86) PCT No.: PCT/RU2018/000095
§ 371 (c)(1),
(2) Date: Aug. 7, 2020

(87) PCT Pub. No.: WO2019/160436
PCT Pub. Date: Aug. 22, 2019

(65) Prior Publication Data
US 2020/0391898 A1    Dec. 17, 2020

(51) Int. Cl.
*A61J 9/00*     (2006.01)
*B65D 1/02*     (2006.01)
(Continued)

(52) U.S. Cl.
CPC .............. *B65D 1/0207* (2013.01); *A61J 9/00* (2013.01); *C03C 4/18* (2013.01); *C03C 10/0027* (2013.01);
(Continued)

(58) Field of Classification Search
CPC .......... B65D 1/00; B65D 1/02; B65D 1/0207; B65D 1/023; B65D 1/0261; B65D 1/0223
See application file for complete search history.

(56) References Cited

U.S. PATENT DOCUMENTS 3,859,117 A * 1/1975 Erchak .................... C03C 17/32
                                                    215/12.2
4,039,310 A    8/1977 Sipe et al.
(Continued)

FOREIGN PATENT DOCUMENTS

| CN | 105683109 A | 6/2016 |
| CN | 105829256 A | 8/2016 |
| CN | 107001120 A | 8/2017 |

OTHER PUBLICATIONS

Chinese Patent Application No. 201880089821.3, Office Action dated Apr. 2, 2022, 9 pages (4 pages of English Translation and 5 pages of Original Document), Chinese Patent Office.
(Continued)

*Primary Examiner* — Laura A Auer
(74) *Attorney, Agent, or Firm* — Daniel J. Greenhalgh

(57) ABSTRACT

Glass-ceramic containers and methods of making glass ceramic containers with high transparency and fracture toughness suitable for use as, for example a beverage or food container, such as for example, a baby bottle or personal hydration bottle. The glass ceramic containers may have an average wall thickness in the range of 1 mm to 2.5 mm and a fracture toughness of 1 MPa*m^½ or more.

19 Claims, 24 Drawing Sheets

(51) Int. Cl.
*C03C 4/18* (2006.01)
*C03C 10/00* (2006.01)
*C03C 10/04* (2006.01)
*C03C 21/00* (2006.01)
*C03B 32/02* (2006.01)

(52) U.S. Cl.
CPC .......... *C03C 10/0054* (2013.01); *C03B 32/02* (2013.01); *C03C 21/002* (2013.01); *C03C 2204/00* (2013.01)

(56) References Cited

U.S. PATENT DOCUMENTS

| | | | |
|---|---|---|---|
| 4,315,573 | A | 2/1982 | Bradley et al. |
| 8,839,644 | B2 | 9/2014 | Brown et al. |
| 9,499,434 | B1 | 11/2016 | Sharma et al. |
| 2013/0045375 | A1 | 2/2013 | Gross |
| 2014/0120279 | A1 | 5/2014 | Demartino et al. |
| 2014/0154438 | A1* | 6/2014 | Sharma ................ C03C 21/002 428/34.4 |
| 2015/0329406 | A1 | 11/2015 | Kawamoto et al. |
| 2016/0102010 | A1 | 4/2016 | Beall et al. |
| 2017/0334767 | A1 | 11/2017 | Beall et al. |

OTHER PUBLICATIONS

Analysis of Brittle Fracture of Soda Glass Bottles under Hydrostatic Pressure., D.D. Cannon, C.S. Musso, J.C. Williams, and T.W. Eagar, JFAPBC (2004) 5:72-77.
Determination of Unique Fracture Patterns in Glass and Glassy Polymers. Frederic A. Tulleners, John Thornton, Allison C. Baca., Document No. 241445, University of California 2013.
International Search Report and Written Opinion of the International Searching Authority; PCT/RU2018/000095; Mailed Aug. 28, 2018; 12 Pages; European Patent Office.
The Behavior of Glass Bottles Under Impact, by R; E. Mould, Preston Laboratories, Butler, Pennsylvania, Journal of American Ceramic Society , 1952.
The study of high-speed fracture behavior of glass bottles using explosive shock waves., H. Sakamoto et al. Computational Methods and Experimental Measurements XII 497, 2005.

* cited by examiner

HIGH STRENGTH TRANSPARENT GLASS-CERAMIC CONTAINERS

CROSS-REFERENCE TO RELATED APPLICATIONS

This Application claims benefit of priority under 35 U.S.C. § 365 of International Patent Application Serial No. PCT/RU2018/000095 filed on Feb. 19, 2018 designating the United States of America, the content of which is relied upon and incorporated herein by reference in its entirety.

BACKGROUND

Field

Embodiments relate to glass-ceramic containers. In particular, the present disclosure related to a glass-ceramic container with high transparency and fracture toughness suitable for use as, for example a beverage or food container, such as for example, a baby bottle or personal hydration bottle.

Technical Background

Conventional materials used to manufacture food or beverage containers include plastic (e.g., TRITAN™ (a kind of copolyester) and polypropylene) and stainless steel. A problem with such plastics is that it may leach harmful chemicals (e.g., endocrine disrupters like BPA) into the contents of the container. An issue with stainless steel is that it is not transparent, and some consumers report that they do not like the taste of drinks in stainless steel. Many of the glass baby feeding bottles are made from borosilicate compositions. Many of the glass personal hydration bottles on the market are soda lime glass.

Glass containers are preferred in many instances because of their superior chemical properties. Food and beverages in contact with glass are typically deemed safer and taste better than those in contact with metal or plastic containers. However, glass containers can break when subjected to normal use conditions (being dropped on the ground, or subjected to thermal shocks). So there is a strong desire for glass containers to be strong enough to survive the same kinds of use conditions as metal and plastic containers.

Currently, techniques used to strengthen a glass container include: increasing the wall thickness of the container (which means heavier weight), an ion-exchange process, or a tempering process. Each of these have disadvantages. Accordingly, there remains a need for a strengthened glass bottle that does not involve heavier weight and/or the use of ion-exchange or tempering to create central tension.

BRIEF SUMMARY

The present disclosure is directed to a lightweight, highly transparent and fracture resistant container composed of a glass ceramic material. The lightweight, transparent and fracture resistant container may be suitable for use as, for example a beverage or food container, such as for example, a baby bottle or personal hydration bottle.

Some embodiments are directed to a glass-ceramic container including a body including a glass-ceramic material and a hollow interior defined by a circumferential sidewall, a top end, and a bottom end, where the circumferential sidewall has an average wall thickness in the range of 1 mm to 2.5 mm, the glass-ceramic material is transparent, and the glass-ceramic material has a fracture toughness of 1 $MPa*m^{1/2}$ or more.

In some embodiments, the container according to the embodiment of the preceding paragraph may include and average wall thickness is the range of 1 mm to 2 mm.

In some embodiments, the container according to the embodiments of any of the preceding paragraphs may include a body having radial symmetry about a central vertical axis extending from the top end of the container to the bottom end of the container.

In some embodiments, the container according to the embodiments of any of the preceding paragraphs may include a glass-ceramic material having an average transmittance of 70% or more in the wavelength range of 400 nm to 700 nm through a 1.0 mm thick piece of the glass-ceramic material.

In some embodiments, the container according to the embodiments of any of the preceding paragraphs may include a hollow interior including a height measured from the top end to the bottom end of the container body and an average diameter defined by an inner diameter of the circumferential sidewall along the height of the container body, where the height of the body is larger than the average diameter of the body.

In some embodiments, the container according to the embodiments of any of the preceding paragraphs may include a circumferential sidewall having a maximum thickness and a minimum thickness, where the difference between the maximum thickness and the minimum thickness is 0.20 mm or less.

In some embodiments, the container according to the embodiments of any of the preceding paragraphs may include a body that is a single monolithic piece of glass-ceramic material. In some embodiments, the single monolithic piece of glass-ceramic material may define an outermost surface of the glass-ceramic container and an innermost surface of the glass-ceramic container.

In some embodiments, the container according to the embodiments of any of the preceding paragraphs may include a body that consists essentially of a glass-ceramic material.

In some embodiments, the container according to the embodiments of any of the preceding paragraphs may include a circumferential sidewall having an exterior surface that is not under compressive stress. In some embodiments, the container according to embodiments of any of the preceding paragraphs may include a circumferential sidewall having an exterior surface that is under compressive stress.

In some embodiments, the container according to the embodiments of any of the preceding paragraphs may include a body that includes a base portion adjacent to the bottom end of the body, a spout and neck portion adjacent to the top end of the body, and a middle portion disposed between the base portion and the spout and neck portion, where the average wall thickness of the middle portion is less than the average wall thickness of the base portion and the spout and neck portion. In some embodiments, the container may include an average wall thickness in the range of 2 mm to 1.2 mm for the middle portion and an average wall thickness in the range of 3 mm to 1.5 mm for the base portion and the spout and neck portion.

In some embodiments, the container according to embodiments of any of the preceding paragraphs may include a glass-ceramic material that meets Class 3 hydrolytic stability for European Pharmacopoeia 8.4 Hydrolytic Resistance Test.

In some embodiments, the container according to embodiments of any of the preceding paragraphs may include a glass-ceramic material that has a retained strength of at least 200 MPa in ring-on-ring testing after being statically indented with a 136 degree diamond with a 50 gram force.

In some embodiments, the container according to embodiments of any of the preceding paragraphs may include a glass-ceramic material has a retained strength of at least 40 MPa in ring-on-ring testing after being dynamically indented with a 110 degree diamond at 200 mm/s with a 1 kilogram sled.

In some embodiments, the container according to embodiments of any of the preceding paragraphs may include a glass-ceramic material including 70% or more crystalline material by volume.

In some embodiments, the container according to embodiments of any of the preceding paragraphs may be a baby bottle.

In some embodiments, the container according to embodiments of any of the preceding paragraphs may include a glass-ceramic material including a petalite crystalline phase and a lithium silicate crystalline phase, where the petalite crystalline phase and the lithium silicate crystalline phase have higher weight percentages than other crystalline phases present in the glass-ceramic material. In some embodiments, the petalite crystalline phase may comprise 20 to 70 wt % of the glass-ceramic material and the lithium silicate crystalline phase may comprise 20 to 60 wt % of the glass-ceramic material.

In some embodiments, the container according to embodiments of any of the preceding paragraphs may include a glass-ceramic material having a composition comprising, in wt %: $SiO_2$: 55-80%; $Al_2O_3$: 2-20%; $Li_2O$: 5-20%; $B_2O_3$: 0-10%; $Na_2O$: 0-5%; ZnO: 0-10%; $P_2O_5$: 0.5-6%; MgO: 0-5%; and $ZrO_2$: 0.2-15%.

Some embodiments are directed to a method of making a glass-ceramic container, the method including molding a glass material into a glass container, the glass container including a body having a hollow interior defined by a circumferential sidewall, a top end, and a bottom end; and ceramming the glass container at a temperature in the range of 500 degrees C. to 900 degrees C. to crystalize the glass material into a glass-ceramic material, thereby forming a glass-ceramic container, where the circumferential sidewall has an average wall thickness in the range of 1 mm to 2.5 mm, the glass-ceramic material is transparent, and the glass-ceramic material has a fracture toughness of 1 MPa*m^½ or more.

In some embodiments, the method according to the embodiment of the preceding paragraph may be devoid of an ion-exchange process, a tempering process, and a lamination process. In some embodiments, the method according to the embodiments of the preceding paragraph may include an ion-exchange process, and the glass-ceramic material may have a first fracture toughness before the ion-exchange process and a second fracture toughness greater than the first fracture toughness after the ion-exchange process.

Some embodiments are directed to a glass ceramic container made by a method including the steps of: molding a glass material into a glass container, the glass container including a body having a hollow interior defined by a circumferential sidewall, a top end, and a bottom end; and ceramming the glass container at a temperature in the range of 500 degrees C. to 900 degrees C. to crystalize the glass material into a glass-ceramic material, thereby forming a glass-ceramic container, where the circumferential sidewall has an average wall thickness in the range of 1 mm to 2.5 mm, the glass-ceramic material is transparent, the glass-ceramic material has a fracture toughness of 1 MPa*m^½ or more, the glass-ceramic material is non-tempered, the glass-ceramic material is a single monolithic piece of glass-ceramic material, and an exterior surface of the circumferential sidewall is not under compressive stress.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
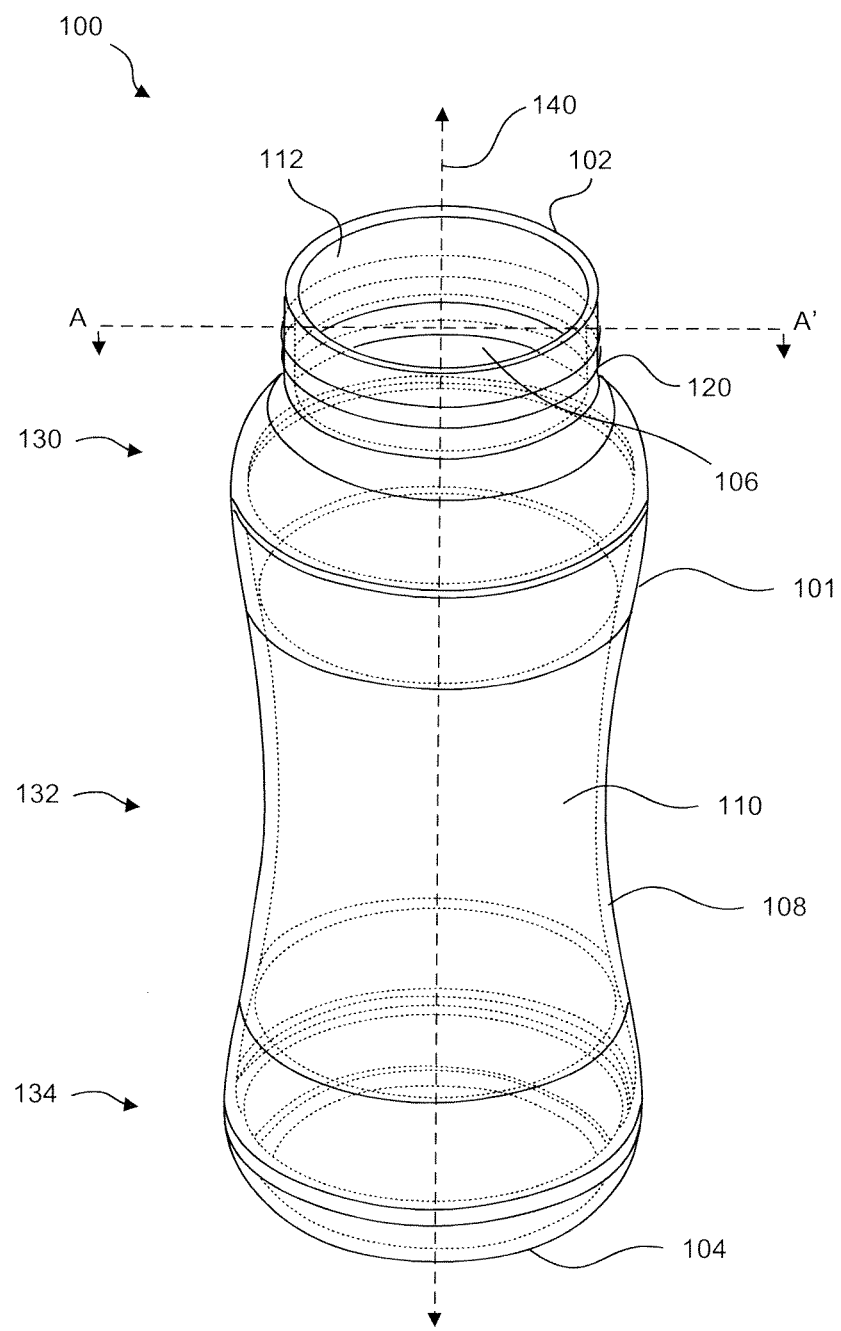
FIG. 1 illustrates a container according to some embodiments.

In the following detailed description, numerous specific details may be set forth in order to provide a thorough understanding of embodiments described herein. However, it will be clear to one skilled in the art when embodiments may be practiced without some or all of these specific details. In other instances, well-known features or processes may not be described in detail so as not to unnecessarily obscure the disclosure. In addition, like or identical reference numerals may be used to identify common or similar elements. Moreover, unless otherwise defined, all technical and scientific terms used herein have the same meaning as commonly understood by one of ordinary skill in the art to which this disclosure belongs. In case of conflict, the present specification, including the definitions herein, will control.

Although other methods and materials can be used in the practice or testing of the embodiments, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. More specifically, the example composition ranges given herein are considered part of the specification and further, are considered to provide example numerical range endpoints, equivalent in all respects to their specific inclusion in the text, and all combinations are specifically contemplated and disclosed. Further, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the disclosure be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

Transparent containers, for example containers used in the food and beverage industry or the medical and pharmaceutical industry, serve to, among other things, allow the contents of the container to be easily viewed by a user and to protect the contents from contamination. These containers are also typically subjected to severe mechanical stress, such as for example, thermal shock or thermal cycling during use and/or cleaning of the container and impact stresses when the containers are dropped. Transparent containers having superior mechanical properties that resist failure (e.g., fracturing) during severe mechanical stress result are more durable. In some instances the weight of such containers is also a factor. These containers may be transported frequently, for example, during travel or during lab experiments. Accordingly, a lightweight transparent container that exhibits superior mechanical properties may be desirable.

Containers according to the present disclosure are made from a glass-ceramic material that has increased strength and fracture toughness, yet maintains the transparency, chemical durability, inertness, and all other attributes that make glass a desirable material for food, beverage, and medical containers. The increased strength and fracture toughness allow the container to have better mechanical performance (survive more mechanical abuse, such as being dropped on a hard or sharp surface) than containers made out of standard glass materials such as soda lime or borosilicate glass. Additionally, the increased strength can allow the container to be made with thinner walls while retaining at least the same mechanical performance as containers made from standard glass materials.

Containers according to the present disclosure may be, but are not limited to, baby bottles, personal hydration bottles, pharmaceutical vials, laboratory vessels, and the like. The containers improve upon plastic containers by replacing the plastic with an inert, safe material that does not leach harmful chemicals, such as endocrine disruptors, into the contents of the container. They also improve the environmental impact by replacing plastic containers, which do not biodegrade, with a reusable glass-ceramic material. The containers also improve upon glass containers (which are themselves an improvement on plastic containers as noted above) by offering improved mechanical performance. The improved mechanical performance of the containers improves their resistance to failure (e.g., fracture) and facilitates the manufacture of thinner and lighter containers that perform as well as their glass counterparts.

In some embodiments, these improvements can be achieved without the use of one or more of the following methods of strengthening a glass or glass-ceramic material: an ion-exchange process, a tempering processes, or lamination process. In some embodiments, these improvements can be achieved without the use of any of these three strengthening methods. Eliminating the need for one or more of these methods can decrease manufacturing costs and eliminate the disadvantages associated with these methods.

Ion-exchange implants larger ions in the surface of the container, producing compressive stress. The difficulty with using it in containers is that it works best when all parts of the article are of uniform thickness. A container made by, for example, press and blow molding may not have good thickness uniformity. As such, ion exchange may produce containers with some regions of high central tension and some with low central tension. This would tend to produce local areas more prone to failure. Ion exchange can also produce very high central tension that can provide the driving force for delayed failure (a crack that grows until it is deep enough to liberate the central tension). If the container is intended to be used multiple times in rugged environments, the possibility of delayed failure is a problem.

Tempering is the process of heating an article and then quenching the surface, which produces a compressive stress at the surface and central tension in the middle of the glass wall. The issues with using it for containers include: a) it typically only works well on thick walls (3 mm or greater), which makes the container quite heavy, b) it can be challenging to extract heat from the inner surface of the container, due to convection currents that are needed to evacuate the hot air from the inside of the container, and c) it can place some design limitations on the container.

Lamination is the process of making the container walls out of multiple layers, e.g., multiple layers of different glasses. For example, a laminated glass material may include a low coefficient of thermal expansion (CTE) glass for the clad layer and a high CTE glass for the core layer. The challenge with such an approach is achieving uniform thickness of the layers all around the container, including the bottom, without exposing the central tension in the core.

In some embodiments, the glass-ceramic container may include walls with a consistent and highly controlled thickness and with no central tension, and the processes employed to produce the container may not create any kind of central tension. Removing central tension reduces that chance of delayed or spontaneous failure. Further, a consistent wall thickness reduces the likelihood of mechanical failure associated with regions of high central tension and some with low central tension created by unintended changes in thickness. Containers according to the present disclosure make it more difficult for a crack to propagate in the container, which leads to better mechanical performance and/or the ability to make the walls thinner.

In some embodiments, a container is made from a glass-ceramic material exhibiting the following qualities: (a) a chemically inert material generally regarded as safe for food and beverage contact, (b) a higher fracture toughness than other glass materials, but is otherwise indistinguishable from glass—it is transparent, inert, and formable with the same glass-making methods, and (c) produces a container which has better mechanical performance and/or thinner walls than containers made from standard glass materials (e.g., soda lime and borosilicate). In some embodiments, the glass-ceramic material may meet Class 3 hydrolytic stability for European Pharmacopoeia 8.4 Hydrolytic Resistance Test.

Glass-ceramic containers according to the present disclosure have increased mechanical reliability compared to conventional glass containers while also retaining the transparency, chemical inertness, and formability of convention glass containers. Normally, superior mechanical properties, such as toughness, come at the expense of transparency. Glass-ceramic containers according to the present disclosure do not require compromises in durability or in manufacturability.

In some embodiments, containers according to the present disclosure include a circumferential sidewall that comprises an average wall thickness in the range of 1 mm (millimeters) to 2.5 mm. In some embodiments, the average wall thickness may be in the range of range of 1 mm to 2 mm. In some embodiments, the average wall thickness may be in the range of range of 1 mm to 1.8 mm. In some embodiments, the average wall thickness may be in the range of range of 1 mm to 1.5 mm. In some embodiments, the average wall thickness may be about 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, or within any range having two of these values as endpoints. In some embodiments, a container having an internal volume in the range of 200 mL to 350 mL (e.g., a 200 mL to 350 mL baby bottle) may have a sidewall with such an average thickness.

As used herein "average wall thickness" means the integral of the thickness for a wall over the exterior surface area of the wall divided by the exterior surface area of the wall. Surface features formed on an exterior or interior surface of a wall, such as attachment mechanisms (e.g., threads formed on the wall) or a handle, are not included in the calculation of average wall thickness. In embodiments were a container has radial symmetry about a central vertical axis extending from a top end of the container to a bottom end of the container, the average wall thickness may be defined by the average wall thickness of a thickness profile of the wall measured on a vertical plane extending through the central vertical axis and bisecting the container from the top end of the container to the bottom end of the container. In such embodiments, the average wall thickness may be measured by cutting the container along the vertical plane and averaging the thickness of the thickness profile. Unless otherwise specified, the thickness of a wall is measured in a direction perpendicular to the exterior surface of the wall.

Average wall thickness may be measured by either of the following two methods. (1) A magnetic-ball measurement method. In this method, thickness is determined by measuring the distance of a reference ball to the sensor tip. A magnet attracts the reference ball which holds it exactly over the probe tip. And a Hall-effect sensor built into the probe measures the distance between the probe tip and reference ball. Magna-Mike 8500 manufactured by Olympus Corporation is an exemplary probe for performing magnetic-ball measurement of average wall thickness for containers discussed herein. The following formula may be used to express the average wall thickness when measured by a magnetic-ball measurement method:

$$T = \frac{\int_A^0 t\, dA}{A}$$

where T=average wall thickness, t=thickness, A=the exterior surface area of a container body. A magnetic-measurement method is the preferred method for a container lacking radial symmetry about a central axis of the container, however it may also be used to measure the average wall thickness for a container having radial symmetry about a central axis.

(2) Cutting the container along a vertical plane extending through a central vertical axis and bisecting the container from the top end of the container to the bottom end of the container and averaging the thickness of the container wall on the vertical plane. The cross-sectional shape of the container along the vertical plane may be referred to as a "thickness profile." In this method, the thickness of the thickness profile for a container is measured at a suitable number of representative points and these thickness values are averaged to determine an average wall thickness of the container. In a preferred method, the suitable number of thickness measurement is 20 or more. When measuring that averages thickness the points of measurement are preferably equally distributed along the thickness profile from one end of the profile to the other. This method is preferred for containers having radial symmetry about a central axis of the container. In both method (1) and (2), surface features formed on an exterior or interior surface of a wall, such as attachment mechanisms (e.g., threads formed on the wall), a handle, or other gripping features, such a bumps or grooves, are not included in the calculation of average wall thickness.

An average wall thickness having a value or range as discussed herein may facilitate the manufacture of lightweight containers by decreasing the volume of material needed to manufacture a container have suitable mechanical characteristics. Also, such an average wall thickness or range may facilitate the manufacture of a transparent container by reducing the thickness of material through which light must travel in order to travel through a wall of the container.

In some embodiments, containers according to the present disclosure include a body comprising a the glass-ceramic material having a fracture toughness of 1 MPa*m^½ or more. In some embodiments, the glass-ceramic material may have a fracture toughness of 1.1 MPa*m^½ or more, 1.2 MPa*m^½ or more, 1.3 MPa*m^½ or more, 1.4 MPa*m^½ or more, 1.5 MPa*m^½ or more, 1.6 MPa*m^½ or more, 1.7 MPa*m^½ or more, 1.8 MPa*m^½ or more, 1.9 MPa*m^½ or more, or 2 MPa*m^½ or more. In some embodiments, the glass-ceramic material may have a fracture toughness of 1 MPa*m^½, 1.1 MPa*m^½, 1.2 MPa*m^½, 1.3 MPa*m^½, 1.4 MPa*m^½, 1.5 MPa*m^½, 1.6 MPa*m^½, 1.7 MPa*m^½, 1.8 MPa*m^½, 1.9 MPa*m^½, 2 MPa*m ½, or within any range having any two of these values as endpoints. The fracture toughness may be measured using known methods in the art, for example, using a chevron notch short beam, according to ASTM C1421-10, "Standard Test Methods for Determination of Fracture Toughness of Advanced Ceramics at Ambient Temperature".

In some embodiments, the glass-ceramic material may have facture toughness value as discussed herein without the need to subject that glass-ceramic material to an ion-exchange process or a tempering process. In such embodiments, a container body comprising the glass-ceramic material may have a circumferential sidewall with an exterior surface that is not under compressive stress relative to a central region of the body. In some embodiments, the glass-ceramic material may be subject to an ion-exchange process or tempering process to modify properties of the glass-ceramic material, such as the strength of the glass ceramic material.

In some embodiments, the ion-exchange process or tempering process may increase the strength of the glass ceramic material by imparting compressive stresses on interior and/or exterior surface of a container's sidewall (i.e., by creating surface compression). In embodiments including an ion-exchange process, the ion-exchange process may implant ions that create compressive stresses on interior and/or exterior surfaces of a container's sidewall. In some embodiments, the surface compression is balanced by a tensile stress region in the glass-ceramic. In such embodiments, tensile stresses will develop in a central region of the container's sidewall between the interior and exterior surfaces.

In some embodiments, the glass or glass ceramic may have surface compressive stress of between about 100 MPa and about 1000 MPa, between about 100 MPa and about 800 MPa, between about 100 MPa and about 500 MPa, between about 100 MPa and about 300 MPa, or between about 100 MPa and about 150 MPa. In some embodiments, the DOC (depth of compression) may be between 0.05*t and about 0.21*t (where t is thickness of the glass ceramic sidewall in micrometers). In some embodiments, DOC may be in the range from about 0.05*t to about 0.2*t, from about 0.05*t to about 0.18*t, from about 0.05*t to about 0.16*t, from about 0.05*t to about 0.15*t, from about 0.05*t to about 0.12*t, from about 0.05*t to about 0.1*t, from about 0.075*t to about 0.21*t, from about 0.1*t to about 0.21*t, from about 0.12*t to about 0.21*t, from about 0.15*t to about 0.21*t, from about 0.18*t to about 0.21*t, or from about 0.1*t to about 0.18*t.

In some embodiments, glass-ceramic containers according to the present disclosure include a body that is a single monolithic piece of glass-ceramic material. As used herein "single monolithic piece" means an article having a generally consistent composition across its volume. An article that is made by layering one or more materials, or by mechanically attaching different parts, is not considered a single monolithic piece. In other words, a body of glass-ceramic material that is a single monolithic piece is not manufactured using a lamination process and/or a mechanical attachment process. In such embodiments, the single monolithic piece of glass-ceramic material may define an outermost surface of the glass-ceramic container (i.e., the surface of the container in contact with the atmosphere) and an innermost surface of the glass-ceramic container (i.e., the surface of the container in contact with the contents of the container).

In some embodiments, containers according to the present disclosure include a body consisting essentially of a glass-ceramic material discussed herein. In some embodiments, containers according to the present disclosure include a body consisting of a glass-ceramic material discussed herein.

FIG. 1 illustrates a glass-ceramic container 100 according to some embodiments. Glass ceramic container 100 includes a body 101 having a top end 102, a bottom end 104, and a circumferential sidewall 108. Top end 102 and/or bottom end 104 may be an open end that may be removably covered and/or sealed with, for example, a cap or lid. In some embodiments, top end 102 or bottom end 104 may be a closed end. Together, top end 102, bottom end 104, and circumferential sidewall 108 define a hollow interior 106 of body 101. In operation, hollow interior 106 houses the contents (e.g., fluid(s)) of container 100. As used herein, the term "circumferential" applies not only to circular or cylindrical transverse cross-sectional shapes but also to any transverse cross-sectional shape.

In some embodiments, hollow interior 106 may have an interior volume of about 280 milliliters (mL). In some embodiments, hollow interior 106 may have an interior volume in the range of 250 mL to 350 mL. In some embodiments, hollow interior 106 may have an interior volume in the range of 400 mL to 1000 mL. In some embodiments, body 101 may have a weight of 150 grams or less per 280 mL of internal volume of hollow interior 106. In some embodiments, for a body 101 having an interior volume of 280 mL+/−30%, body 101 may have a weight of 150 grams or less.

Also as shown in FIG. 1, container 100 includes a spout and neck portion 130, a middle portion 132, and a base portion 134. Base portion 134 is adjacent to and includes bottom end 104 of body 101. Spout and neck portion 130 is adjacent to and includes top end 102 of body 101. And middle portion 132 is disposed between base portion 134 and spout and neck portion 130. Portions 130, 132, and 134 are not intended to demarcate precise areas of container 100. Rather, portions 130, 132, and 134 are intended to represent general areas of container 100 that provide a frame of reference. In some embodiments, spout and neck portion 130 may include threads 120 for coupling with a cap or lid to cover and/or seal top end 102 of body 101. In such embodiments, threads 120 may be located on a spout portion of the spout and neck portion 130. In some embodiments, portion 130 may not include a neck portion and therefore may be called a spout portion, or an open end portion.

Circumferential sidewall 108 has an exterior surface 110, an interior surface 112, and a wall thickness 114 measured between exterior surface 110 and interior surface 112. In some embodiments, exterior surface 110 may define all, or at least a portion of, an outermost surface of glass-ceramic container 100 (i.e., the surface of container 100 in contact with the atmosphere). In some embodiments, interior surface 112 may define all, or at least a portion of, an innermost surface of glass-ceramic container 100 (i.e., the surface of container 100 in contact with the contents of container 100).

In some embodiments, glass-ceramic container 100 and/or body 101 may have a radial symmetry about a central vertical axis 140 extending from top end 102 of body 101 to bottom end 104 of body 101. Central vertical axis 140 may be the imaginary line running through the center of gravity of body 101 between top end 102 and bottom end 104.

Hollow interior 106 has height measured from top end 102 to bottom end 104 of body 101 and an average diameter defined by an inner diameter of circumferential sidewall 108 along the height of body 101. In some embodiments, the height of body 101 may be larger than the average diameter of body 101. In some embodiments, the height of body 101 may be smaller than the average diameter of body 101. In some embodiments, the height of body 101 may be about the same as the average diameter of body 101.

Figure 2:
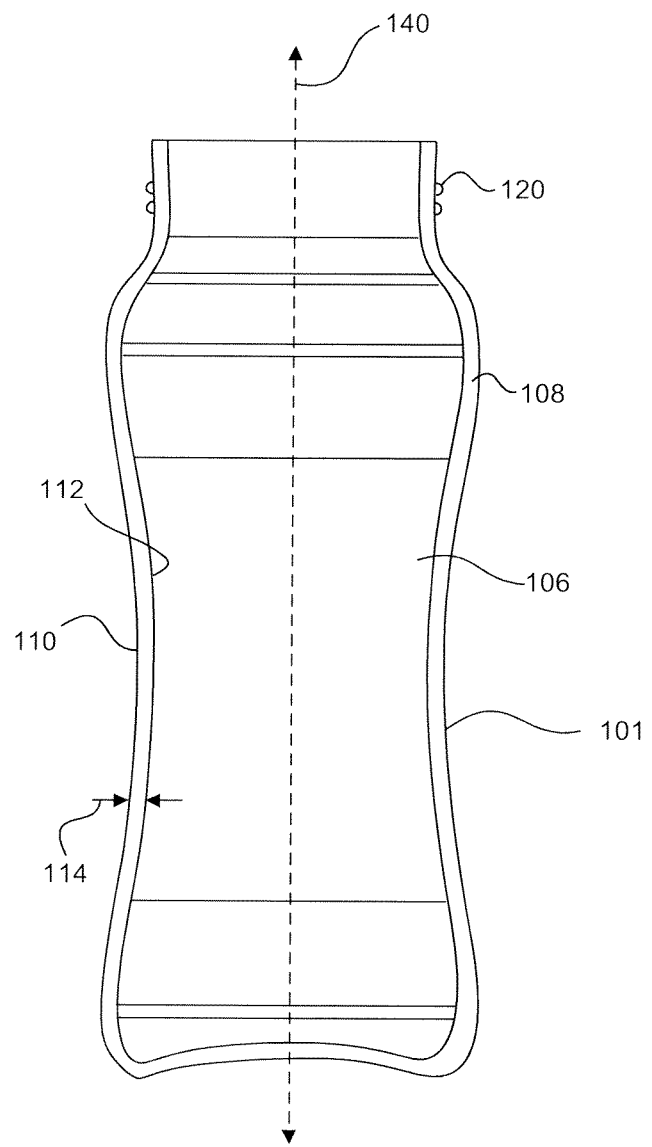
FIG. 2 illustrates a cross-sectional view of a container according to some embodiments.
Figure 3:
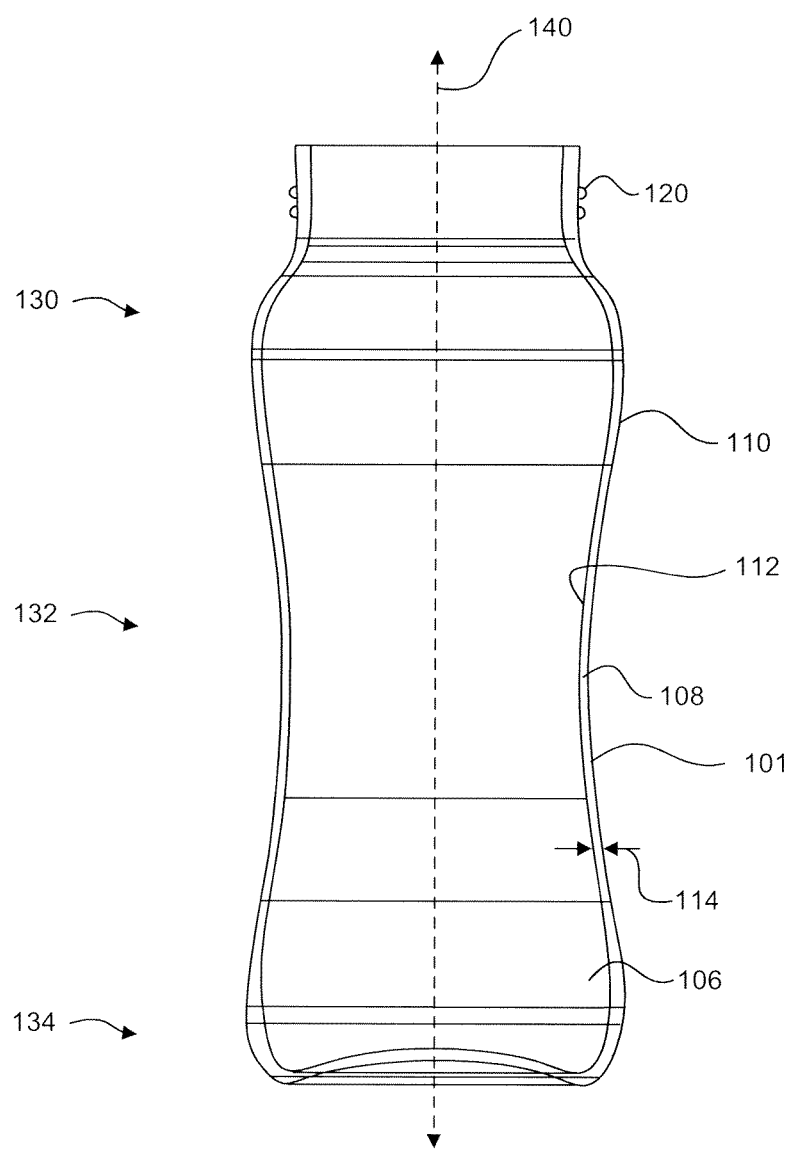
FIG. 3 illustrates a cross-sectional view of a container according to some embodiments.

In some embodiments, body 101 may have a uniform wall thickness 114. FIG. 2 shows body 101 having a uniform wall thickness 114 according to an embodiment. In embodiments having a uniform wall thickness 114, the difference between the maximum thickness and the minimum thickness of circumferential sidewall 108 may be 0.20 mm or less, 0.15 mm or less, 0.10 mm or less, or 0.05 mm or less.

A container having uniform wall thickness may be increase the ease and reproducibility of manufacturing a container having desired mechanical and optical characteristics. A uniform wall thickness may reduce the likelihood of mechanical or optical defects due to a change in wall thickness of circumferential sidewall 108. For example, a change in wall thickness, whether intentional or non-intentional, may be associated with stress concentrations that facilitate the formation and growth of cracks. As another example, a change in wall thickness, whether intentional or non-intentional, may result in undesirable optical properties, such as optical distortion or aesthetically unappealing features.

In some embodiments, body 101 may have a non-uniform wall thickness 114. In such embodiments, the wall thickness 114 of body may be tailored to reduce the weight of container while maintaining container strength. In some embodiments, wall thickness 114 in areas/regions of circumferential sidewall 108 subject to the highest level of stress when container is dropped (e.g., stresses imparted by the impact force of container 100 contacting a surface) may have localized increased thickness relative to other areas/regions of circumferential sidewall 108.

In some embodiments, the average wall thickness of middle portion 132 may be less than the average wall thickness of base portion 134 and/or spout and neck portion 130. In some embodiments, the average wall thickness of middle portion 132 may be in the range of 2 mm to 1.2 mm. In some embodiments, the average wall thickness of middle portion 132 may be in the range of 1.8 mm to 1.2 mm. In some embodiments, the average wall thickness of middle portion 132 may be in the range of 1.6 mm to 1.2 mm. In some embodiments, the average wall thickness of middle portion 132 may be in the range of 1.4 mm to 1.2 mm. In some embodiments, the average wall thickness of base portion 134 and/or spout and neck portion 130 may be in the range of 3 mm to 1.5 mm. In some embodiments, the average wall thickness of base portion 134 and/or spout and neck portion 130 may be in the range of 2.5 mm to 1.5 mm. In some embodiments, the average wall thickness of base portion 134 and/or spout and neck portion 130 may be in the range of 2.1 mm to 1.5 mm. In some embodiments, a container having an internal volume in the range of 250 mL to 350 mL (e.g., a 280 mL baby bottle) may have a sidewall with such average thicknesses.

In some embodiments, the average wall thickness of middle portion 132 may be more than the average wall thickness of base portion 134 and/or spout and neck portion 130. In some embodiments, the average wall thickness of base portion 134 and/or spout and neck portion 130 may be in the range of 2 mm to 1.2 mm. In some embodiments, the average wall thickness of base portion 134 and/or spout and neck portion 130 may be in the range of 1.8 mm to 1.2 mm. In some embodiments, the average wall thickness of base portion 134 and/or spout and neck portion 130 may be in the range of 1.6 mm to 1.2 mm. In some embodiments, the average wall thickness of base portion 134 and/or spout and neck portion 130 may be in the range of 1.4 mm to 1.2 mm. In some embodiments, the average wall thickness of middle portion 132 may be in the range of 3 mm to 1.5 mm. In some embodiments, the average wall thickness of middle portion 132 may be in the range of 2.5 mm to 1.5 mm. In some embodiments, the average wall thickness of middle portion 132 may be in the range of 2.1 mm to 1.5 mm. In some embodiments, a container having an internal volume in the range of 200 mL to 350 mL (e.g., a 280 mL baby bottle) may have a sidewall with such average thicknesses.

Figure 4:
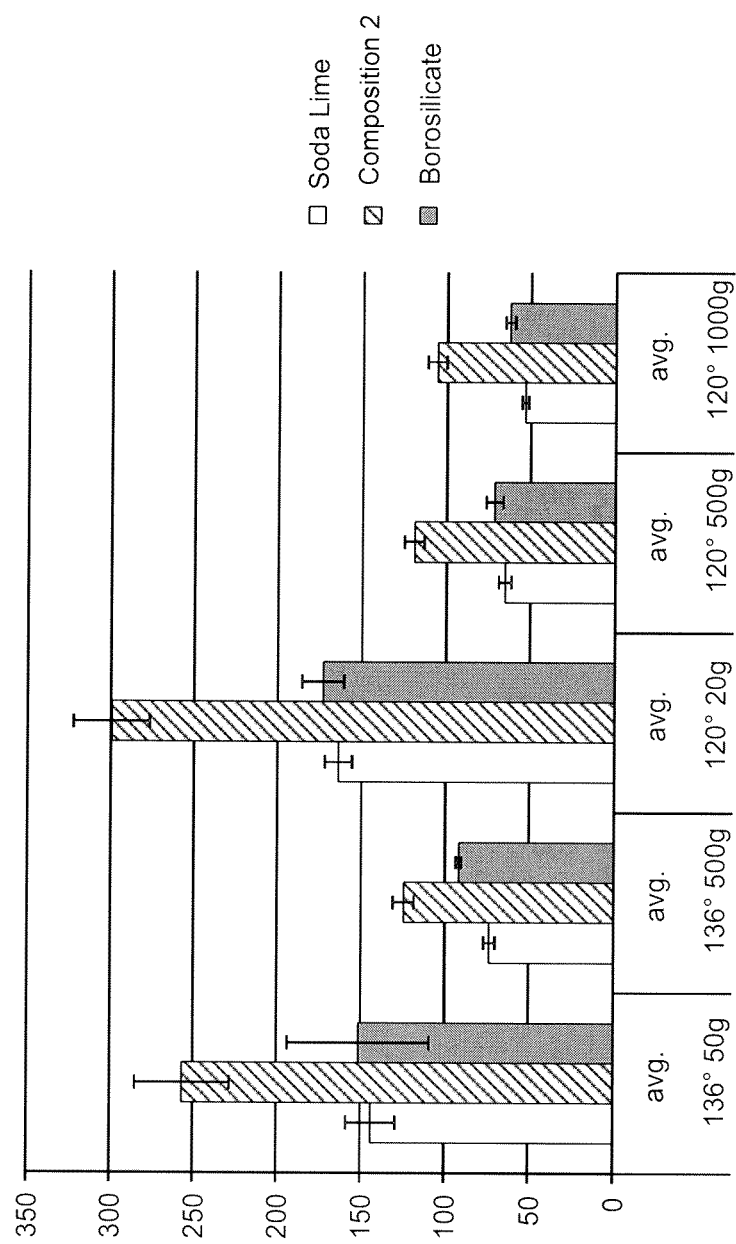
FIG. 4 is a graph of retained strength after static indentation in a ring-on-ring (RoR) test for different compositions tested with different diamond tips and with different weights.

The glass-ceramic material of body 101 has various mechanical attributes superior to traditional glass materials that allow the glass-ceramic material to outperform the glass materials. FIG. 4 shows a graph of retained strength after static indentation in a ring-on-ring (RoR) test for different compositions tested with different diamond tips and with different weights. For the RoR tests shown in FIG. 4, 2 inch×2 inch glass coupons with a 2.0 mm thickness were tested using Vickers hardness. In each test, the coupons were indented with a Vickers hardness tip having the specified angle and held for 24 hours. During static indentation, an inert test condition was maintained by covering the surface of the coupons with heavy mineral oil. Then, after removing the coupons from the static indenter, their strength was measured using the testing procedure of ASTM C1499-15 "Standard Test Method for Monotonic Equibiaxial Flexural Strength of Advanced Ceramics at Ambient Temperature."

As shown in FIG. 4 the glass-ceramic material (Composition 2 in Table 2) exhibits superior retained strength after static indentation compared to traditional soda lime and borosilicate glass materials. This means that the glass-ceramic material is more durable and is more capable of withstanding multiple stress events (e.g., thermal cycling or mechanical impacts) without failure.

As shown in column 1 of the graph in FIG. 4, in some embodiments, the glass-ceramic material has a retained strength of at least 200 MPa in ring-on-ring testing after being statically indented with a 136 degree diamond with a 50 gram force. In some embodiments, the glass-ceramic material has a retained strength of at least 250 MPa in ring-on-ring testing after being statically indented with a 136 degree diamond with a 50 gram force.

As shown in column 2 of the graph in FIG. 4, in some embodiments, the glass-ceramic material has a retained strength of at least 100 MPa in ring-on-ring testing after being statically indented with a 136 degree diamond with a 500 gram force. In some embodiments, the glass-ceramic material has a retained strength of at least 120 MPa in ring-on-ring testing after being statically indented with a 136 degree diamond with a 500 gram force.

As shown in column 3 of the graph in FIG. 4, in some embodiments, the glass-ceramic material has a retained strength of at least 250 MPa in ring-on-ring testing after being statically indented with a 120 degree diamond with a 20 gram force. In some embodiments, the glass-ceramic material has a retained strength of at least 275 MPa in ring-on-ring testing after being statically indented with a 120 degree diamond with a 20 gram force.

As shown in column 4 of the graph in FIG. 4, in some embodiments, the glass-ceramic material has a retained strength of at least 100 MPa in ring-on-ring testing after being statically indented with a 120 degree diamond with a 500 gram force. In some embodiments, the glass-ceramic material has a retained strength of at least 110 MPa in ring-on-ring testing after being statically indented with a 120 degree diamond with a 500 gram force. As shown in column 5 of the graph in FIG. 4, in some embodiments, the glass-ceramic material has a retained strength of at least 100 MPa in ring-on-ring testing after being statically indented with a 120 degree diamond with a 1000 gram force.

Figure 5:
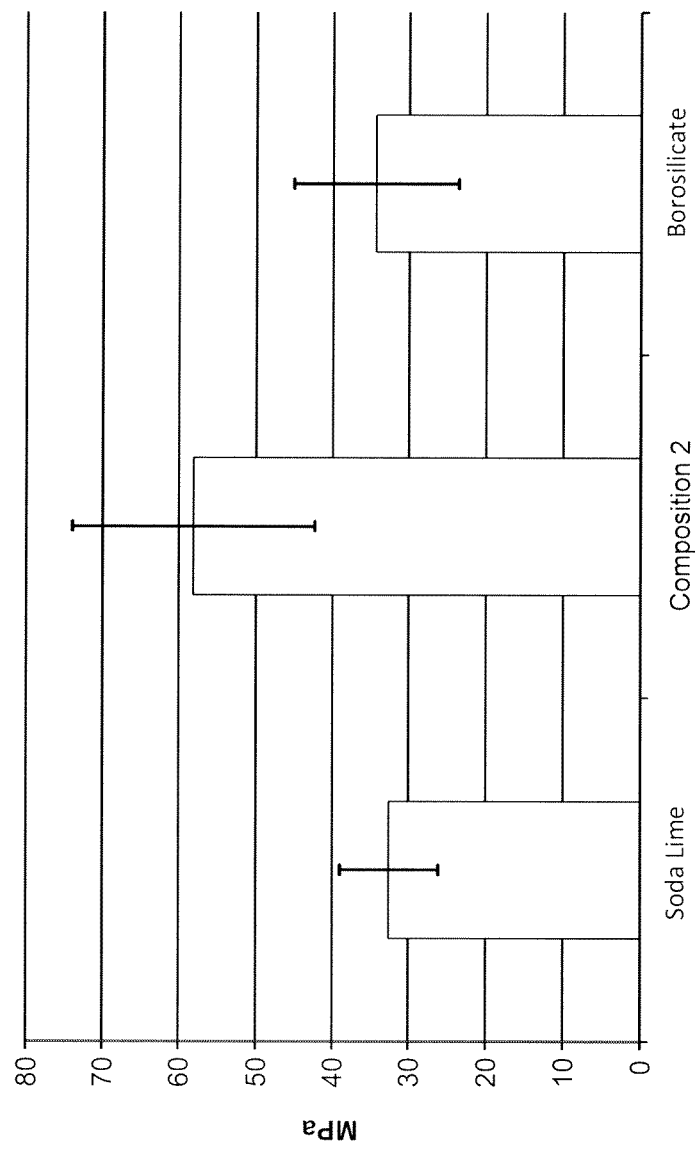
FIG. 5 is a graph of retained strength after dynamic impact in a ring-on-ring (RoR) test for different compositions tested with a 110 degree diamond at 200 mm/s and a 1 kilogram sled.

FIG. 5 shows a graph of retained strength after dynamic impact in a ring-on-ring (RoR) test for different compositions tested with a 110 degree diamond at 200 mm/s and a 1 kilogram mass impact. For the RoR tests shown in FIG. 5, 2 inch×2 inch glass coupons with a 2.0 mm thickness were tested using a dynamic impact which was 0.001 seconds in duration, similar to the response of a glass bottle. Then, after removing the coupons from the dynamic indenter, their strength was measured using RoR based on the testing procedure of ASTM C1499-15 "Standard Test Method for Monotonic Equibiaxial Flexural Strength of Advanced Ceramics at Ambient Temperature."

Similar to the static indentation tests shown in FIG. 4, the glass-ceramic composition (Composition 2) outperforms traditional soda lime and borosilicate glass materials. As shown in FIG. 5, the glass-ceramic material has a retained strength of at least 40 MPa in dynamic ring-on-ring testing after being indented with a 110 degree diamond with a 1 kilogram force. In some embodiments, the glass-ceramic material has a retained strength of at least 50 MPa in dynamic ring-on-ring testing after being indented with a 110 degree diamond with a 1 kilogram force.

Figure 6:
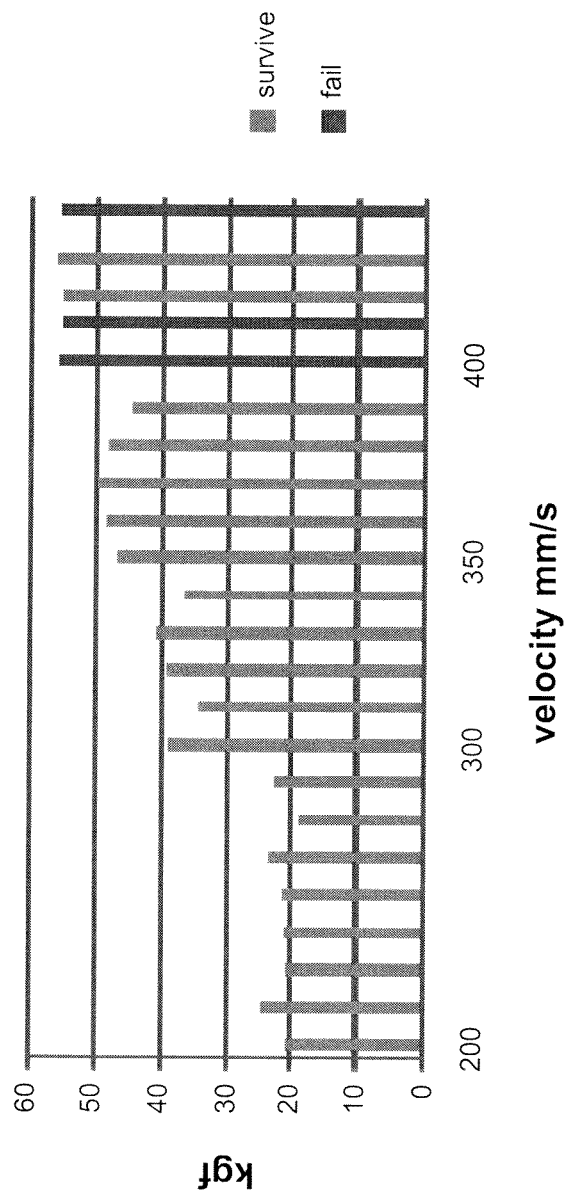
FIG. 6 is a graph of dynamic impact test results in a ring-on-ring (RoR) test for an exemplary glass-ceramic composition tested with a 110 degree diamond up to 400 mm/s and with a 136 degree diamond up to 400 mm/s using 1 kg sled.
Figure 7:
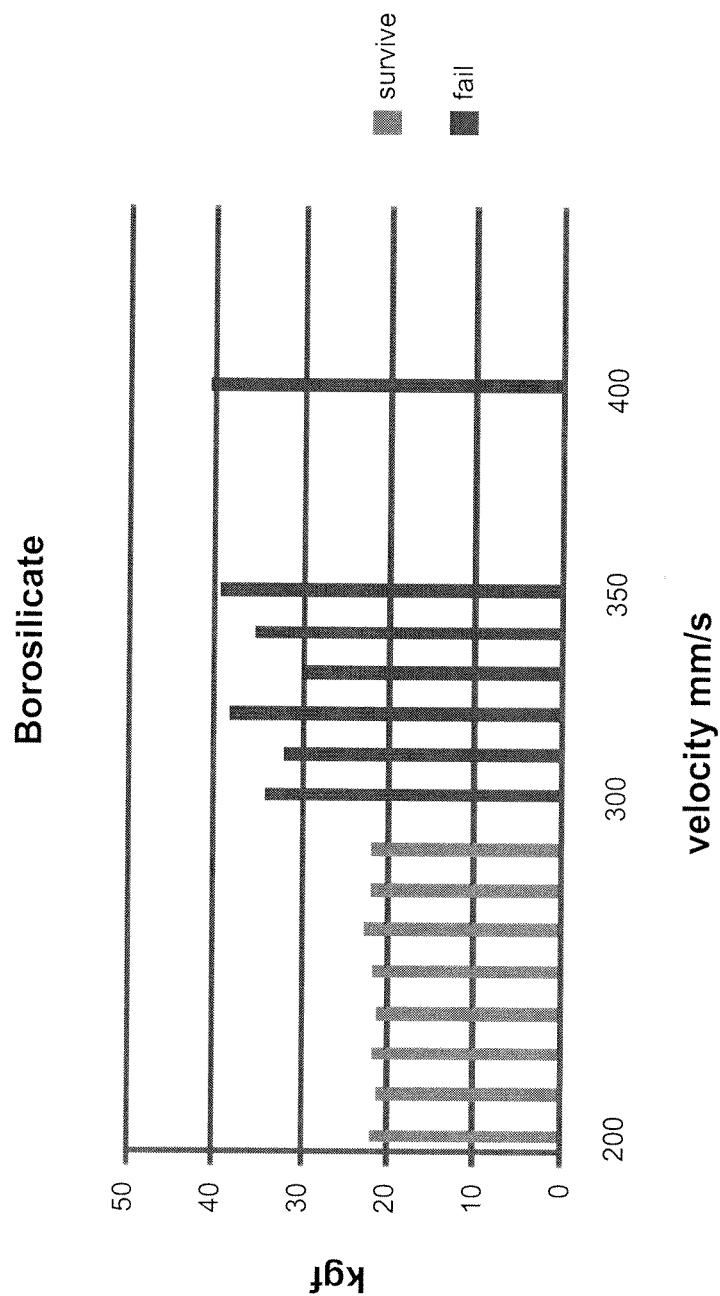
FIG. 7 is a graph of dynamic impact test results in a ring-on-ring (RoR) test for a borosilicate glass tested with a 110 degree diamond up to 400 mm/s and with a 136 degree diamond up to 400 mm/s using 1 kg sled.
Figure 8:
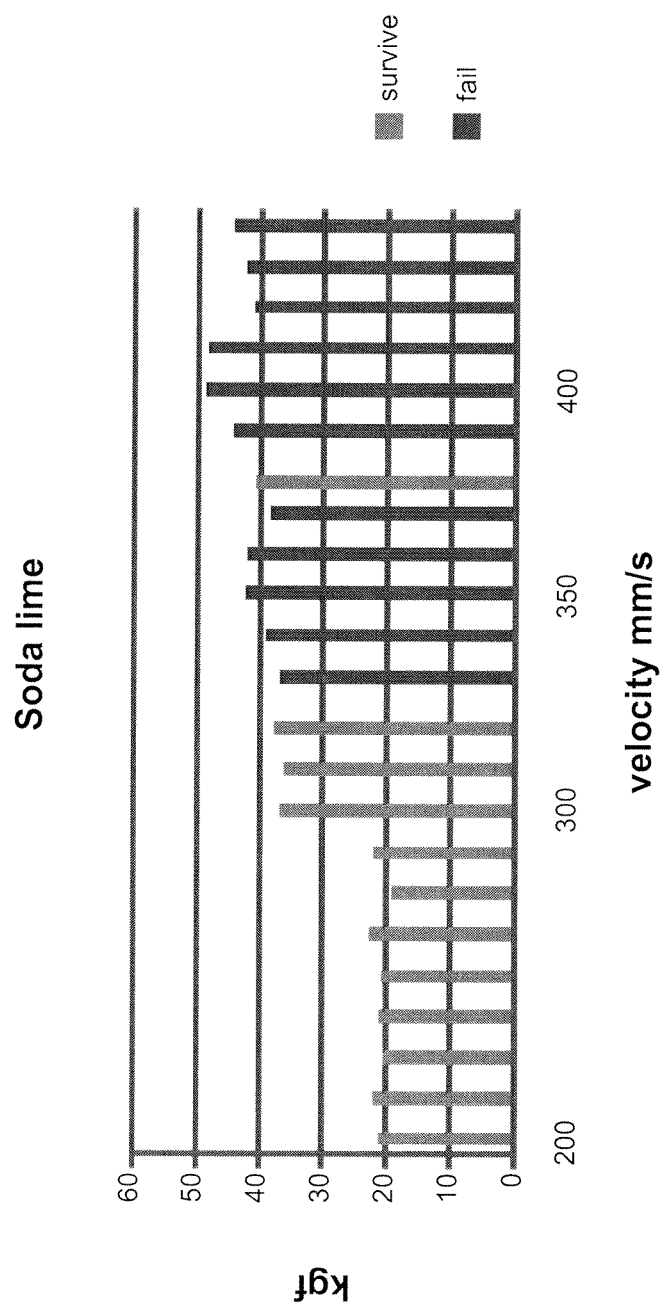
FIG. 8 is a graph of dynamic impact test results in a ring-on-ring (RoR) test for a soda lime silicate glass tested with a 110 degree diamond up to 400 mm/s and with a 136 degree diamond up to 400 mm/s using 1 kg sled.

FIGS. 6-8 show graphs of dynamic impact test results in a ring-on-ring (RoR) test for an exemplary glass-ceramic material (Composition 2), a borosilicate glass, and a soda lime silicate glass tested with a 110 degree diamond up to 400 mm/s and with a 136 degree diamond up to 400 mm/s using 1 kg sled. For the RoR tests shown in FIGS. 6-8, 2 inch×2 inch glass coupons with a 2.0 mm thickness were tested using a dynamic Vickers hardness measurement.

As shown in FIGS. 6-8, embodied compositions (as shown by Composition 2) have the highest percentage of samples that survived the test. The traditional borosilicate and soda lime silicate glasses tend to fail at velocities over 300 mm/s (millimeters per second), while Composition 2 shows the ability to survive up to a velocities of 400 mm/s or more. These tests show that the glass-ceramic material is resistant to the development of through cracks, which cause complete failure of the material, when subject to dynamic loading. In some cases, the samples that survived the testing may have developed surface cracks (i.e., cracks on the surface of the material that do not extend through the thickness of the material), but did not fail due to the formation of through cracks.

Figure 9:
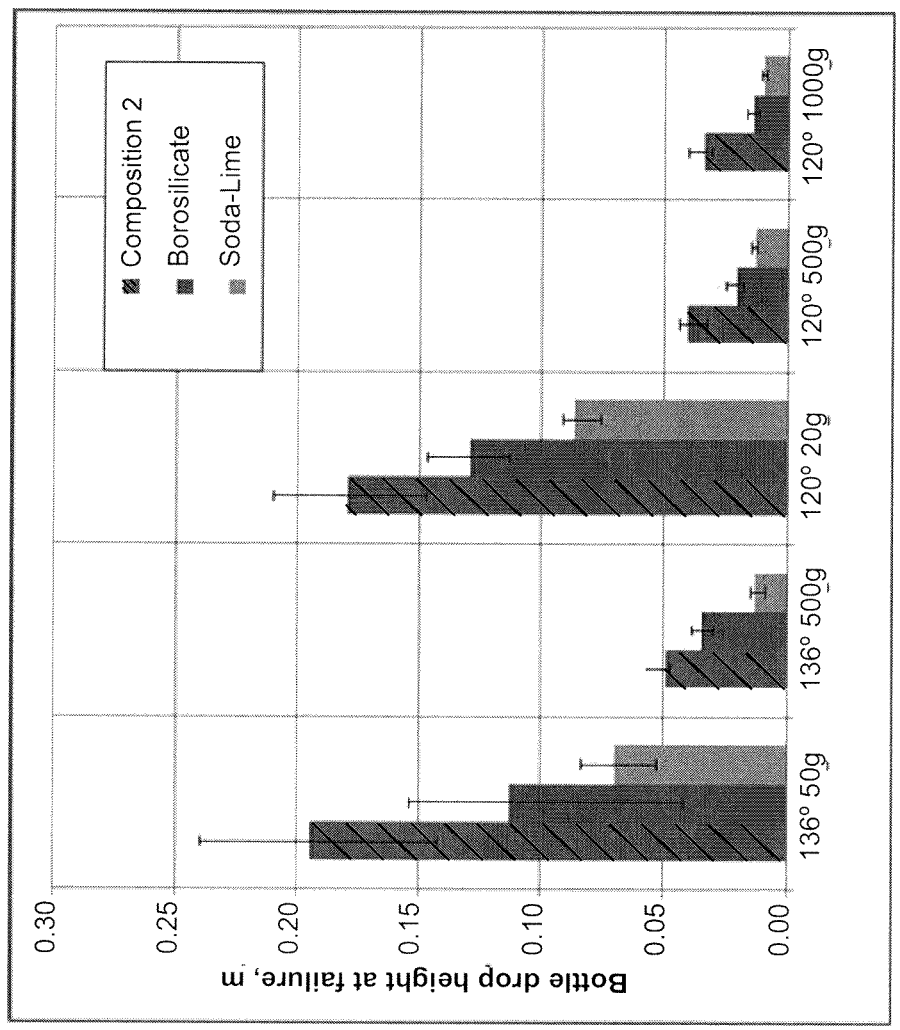
FIG. 9 is a graph of the translation of coupon test data to a bottle drop for a flexure overstresses failure for different compositions.

The impact testing of the materials shown in FIGS. 4-8 was used to model the performance of a containers made from these materials. FIG. 9 shows a graph of the translation of coupon test data (data shown in FIG. 4) to a bottle drop for a flexure overstresses failure for different compositions. In particular, the retained strength of the materials was used to estimate the drop height failure in meters for embodied glass-ceramic materials (as shown by Composition 2) and the traditional soda lime and borosilicate glass materials.

As shown in FIG. 9, the drop height at failure for Composition 2 is estimated to be higher than that of the traditional borosilicate and soda lime silicate glasses based on the indentation diamond and force conditions described above in regards to FIG. 4. The results of the model show that containers made of glass-ceramic materials described herein are more capable of resisting failure due to impact forces imparted on the containers when dropped.

The RoR retained strength tests described herein were used to evaluate the flexural overstress failure mode for the coupons tested and the dynamic impact tests described herein were used to evaluate the damage introduction failure mode of the coupons tested. For the flexure overstress failure mode, embodied compositions (as shown by Composition 2) can survive a 1.6 times higher value of the tensile stresses than traditional borosilicate glass material and a 1.84 times higher value of tensile stresses than traditional soda lime glass material. For the damage introduction failure mode, embodied compositions (as shown by Composition 2) can survive a 1.65 time higher value of impacting force than traditional borosilicate glass material and a 1.58 time higher value of impacting force than traditional soda lime glass material.

Based on the flexural overstress failure mode data and damage introduction failure mode data for the test coupons, bottle drop damage models were created for bottles made using embodied compositions, traditional borosilicate glass, and traditional soda lime glass. For each model, the bottle drop height was 1 meter. And the models calculated the following data: the max tensile stress value as a function of wall thickness for an embodied composition bottle (Composition 2), the contact force as a function of wall thickness for an embodied composition bottle, and the max tensile stress and contact force values for borosilicate and soda lime bottles having a 2.72 mm wall thickness (the wall thickness of a traditional baby bottle).

Then, based on this calculated data, the wall thickness of a Composition 2 bottle needed to perform as well as well as borosilicate and soda lime bottles having a 2.72 mm wall thickness was calculated for both the flexural overstress failure mode and the damage introduction failure mode. Table 1 below shows wall thickness values for bottles that performed at the same level in the flexural overstress failure mode.

TABLE 1

| Bottle | Wall thickness, mm | Mass, g | Damage Introduction Failure Mode Advantage, X times |
|---|---|---|---|
| Comp. 2 | 2.2 | 141 | 2.85 |
| Boro | 2.72 | 185 | |
| Comp. 2 | 1.7 | 120 | 4.17 |
| Soda Lime | 2.72 | 197 | |

As shown in rows 2 and 3 of Table 1, a bottle comprising an embodied composition having the same drop performance as a borosilicate bottle in the flexural overstress failure mode can have a wall thickness of 0.52 mm less (2.72 mm-2.2 mm), weigh 44 grams less (185 g-141 g), and have a 2.85 times advantage in the damage introduction failure mode. And as shown in rows 4 and 5 of Table 1, a bottle comprising an embodied composition having the same drop performance as a soda lime bottle in the flexural overstress failure mode can have a wall thickness of 1.02 mm less (2.72 mm-1.7 mm), weigh 77 grams less (197 g-120 g), and have a 4.17 times advantage in the damage introduction failure mode. The results shown in Table 1 illustrate that glass-ceramic containers according to the present disclosure have increased mechanical reliability compared to conventional glass containers at thinner wall thicknesses and lighter weights.

Glasses and Glass Ceramics

Glass ceramic materials suitable for manufacturing containers discussed herein are as follows. Suitable glass ceramic materials include transparent or translucent lithium-containing aluminosilicate glass ceramic compositions that have petalite and lithium silicate as the primary crystal phases. The lithium silicate crystal phase may be lithium disilicate or lithium metasilicate. Improved properties of the glass and glass ceramic compositions described herein include: 1) the glass retains a low melting temperature (below 1500° C.), yet provides a higher liquidus viscosity (>2000 poise) and a long working range that is compatible with conventional rolling, molding, and float processes; 2) lithium silicate is retained as a major crystal phase, providing inherently high mechanical strength and fracture toughness to the glass-ceramic; and 3) petalite is a second major crystal phase and has a fine grain size, which contributes to the transparency or translucency of the glass-ceramic, and also can be ion-exchanged for additional mechanical strength. Additionally, the materials can be cerammed into shapes with minimal deformation, readily machined to precision shapes, cut, drilled, chamfered, tapped, polished to high luster with conventional ceramic machining tooling and even exhibit various degrees of translucency depending on composition and heat treatment. The glass ceramics can be formed in three-dimensional containers using various methods due to its lower viscosity. In some embodiments, the glass ceramic compositions may include 70% or more crystalline material by volume. In some embodiments, the glass ceramic compositions may include 75% or more, 85% or more, 90% or more, 95% or more, or 98% or more crystalline material by volume.

Petalite, $LiAlSi_4O_{10}$, is a monoclinic crystal possessing a three-dimensional framework structure with a layered structure having folded $Si_2O_5$ layers linked by Li and Al tetrahedra. The Li is in tetrahedral coordination with oxygen. The mineral petalite is a lithium source and is used as a low thermal expansion phase to improve the thermal downshock resistance of glass-ceramic or ceramic parts. In some embodiments, glass-ceramic containers based on the petalite phase can be chemically strengthened in a salt bath, during which $Na^+$ (and/or $K^+$) replaces $Li^+$ in the petalite structure, which causes surface compression and strengthening. In some embodiments, the weight percentage of the petalite crystalline phase in the glass-ceramic compositions can be in a range from about 20 to about 70 wt %, about 20 to about 65 wt %, about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 70 wt %, about 25 to about 65 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 70 wt %, about 30 to about 65 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 70 wt %, about 35 to about 65 wt %, about 35 to about 60 wt %, about 35 to about 55 wt %, about 35 to about 50 wt %, about 35 to about 45 wt %, about 35 to about 40 wt %, about 40 to about 70 wt %, about 40 to about 65 wt %, about 40 to about 60 wt %, about 40 to about 55 wt %, about 40 to about 50 wt %, about 40 to about 45 wt %, about 45 to about 70 wt %, about 45 to about 65 wt %, about 45 to about 60 wt %, about 45 to about 55 wt %, about 45 to about 50 wt %, about 50 to about 70 wt %, about 50 to about 65 wt %, about 50 to about 60 wt %, about 50 to about 55 wt %, about 55 to about 70 wt %, about 55 to about 65 wt %, about 55 to about 60 wt %, about 60 to about 70 wt %, about 60 to about 65 wt %, or about 65 to about 70 wt %. In some embodiments, the glass-ceramic has about 20, 21, 22, 23, 24, 25, 26, 27, 28, 2930, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % petalite crystalline phase.

The lithium silicate crystalline phase may be lithium disilicate or lithium metasilicate. Lithium disilicate, $Li_2Si_2O_5$, is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructures of randomly-oriented interlocked crystals—a crystal structure that forces cracks to propagate through the material via tortuous paths around these crystals. Lithium metasilicate, $Li_2SiO_3$, has an orthorhombic symmetry with ($Si_2O_6$) chains running parallel to the c axis and linked together by lithium ions. Lithium metasilicate crystals can be easily dissolved from glass-ceramics in diluted hydrofluoric acid. In some embodiments, the weight percentage of the lithium silicate crystalline phase in the glass-ceramic compositions can be in a range from about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 60 wt %, about 35 to about 55 wt %, about 35 to about 50 wt %, about 35 to about 45 wt %, about 35 to about 40 wt %, about 40 to about 60 wt %, about 40 to about 55 wt %, about 40 to about 50 wt %, about 40 to about 45 wt %, about 45 to about 60 wt %, about 45 to about 55 wt %, about 45 to about 50 wt %, about 50 to about 60 wt %, about 50 to about 55 wt %, or about 55 to about 60 wt %. In some embodiments, the glass-ceramic has 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % lithium silicate crystalline phase.

There are two broad families of lithium disilicate glass-ceramics. The first group comprises those that are doped with ceria and a noble metal such as silver. These can be photosensitively nucleated via UV light and subsequently heat-treated to produce strong glass-ceramics such as Fotoceram®. The second family of lithium disilicate glass-ceramics is nucleated by the addition of $P_2O_5$, wherein the nucleating phase is $Li_3PO_4$. $P_2O_5$-nucleated lithium disilicate glass-ceramics have been developed for applications as varied as high-temperature sealing materials, disks for computer hard drives, transparent armor, and dental applications.

The glasses and glass ceramics described herein may be generically described as lithium-containing aluminosilicate glasses or glass ceramics and comprise $SiO_2$, $Al_2O_3$, and $Li_2O$. In addition to $SiO_2$, $Al_2O_3$, and $Li_2O$, the glasses and glass ceramics embodied herein may further contain alkali salts, such as $Na_2O$, $K_2O$, $Rb_2O$, or $Cs_2O$, as well as $P_2O_5$, and $ZrO_2$ and a number of other components as described below. In one or more embodiments, the major crystallite phases include petalite and lithium silicate, but β-spodumene ss, β-quartz ss, lithium phosphate, cristobalite, and rutile may also be present as minor phases depending on the compositions of the precursor glass. In some embodiments, the glass-ceramic composition has a residual glass content of about 5 to about 30 wt %, about 5 to about 25 wt %, about 5 to about 20 wt %, about 5 to about 15 wt % about 5 to about 10 wt %, about 10 to about 30 wt %, about 10 to about 25 wt %, about 10 to about 20 wt %, about 10 to about 15 wt %, about 15 to about 30 wt %, about 15 to about 25 wt %, about 15 to about 20 wt %, about 20 to about 30 wt % about 20 to about 25 wt %, or about 25 to about 30 wt %. In some embodiments the residual glass content can be 5, 6, 7, 8, 9, 10, 11, 12, 13, 14, 15, 16, 17, 18, 19, 20, 21, 22, 23, 24, 25, 26, 27, 28, 29, or 30 wt %.

$SiO_2$, an oxide involved in the formation of glass, can function to stabilize the networking structure of glasses and glass ceramics. In some embodiments, the glass or glass ceramic composition comprises from about 55 to about 80 wt % $SiO_2$. In some embodiments, the glass or glass ceramic composition comprises from 69 to about 80 wt % $SiO_2$. In some embodiments, the glass or glass ceramic composition can comprise from about 55 to about 80 wt %, about 55 to about 77 wt %, about 55 to about 75 wt %, about 55 to about 73 wt %, 60 to about 80 wt %, about 60 to about 77 wt %, about 60 to about 75 wt %, about 60 to about 73 wt %, 65 to about 80 wt %, about 65 to about 77 wt %, about 65 to about 75 wt %, about 65 to about 73 wt %, 69 to about 80 wt %, about 69 to about 77 wt %, about 69 to about 75 wt %, about 69 to about 73 wt %, about 70 to about 80 wt %, about 70 to about 77 wt %, about 70 to about 75 wt %, about 70 to about 73 wt %, about 73 to about 80 wt %, about 73 to about 77 wt %, about 73 to about 75 wt %, about 75 to about 80 wt %, about 75 to about 77 wt %, or about 77 to about 80 wt %, $SiO_2$. In some embodiments, the glass or glass ceramic composition comprises about 55, 56, 57, 58, 59, 60, 61, 62, 63, 64, 65, 66, 67, 68, 69, 70, 71, 72, 73, 74, 75, 76, 77, 78, 79, or 80, wt % $SiO_2$.

With respect to viscosity and mechanical performance, the viscosity and mechanical performance are influenced by glass compositions. In the glasses and glass ceramics, $SiO_2$ serves as the primary glass-forming oxide for the precursor glass and can function to stabilize the networking structure of glass and glass ceramic. The concentration of $SiO_2$ should be sufficiently high in order to form petalite crystal phase when the precursor glass is heat treated to convert to a glass-ceramic. The amount of $SiO_2$ may be limited to control melting temperature (200 poise temperature), as the melting temperature of pure $SiO_2$ or high-$SiO_2$ glasses is undesirably high.

$Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass or glass ceramic composition can comprise from about 2 to about 20 wt % $Al_2O_3$. In some embodiments, the glass or glass ceramic composition can comprise from about 6 to about 9 wt % $Al_2O_3$. In some embodiments, the glass or glass ceramic composition can comprise from about 2 to about 20%, about 2 to about 18 wt %, about 2 to about 15 wt %, about 2 to about 12 wt %, about 2 to about 10 wt %, about 2 to about 9 wt %, about 2 to about 8 wt %, about 2 to about 5 wt %, about 5 to about 20%, about 5 to about 18 wt %, about 5 to about 15 wt %, about 5 to about 12 wt %, about 5 to about 10 wt %, about 5 to about 9 wt %, about 5 to about 8 wt %, about 6 to about 20%, about 6 to about 18 wt %, about 6 to about 15 wt %, about 6 to about 12 wt %, about 6 to about 10 wt %, about 6 to about 9 wt %, about 8 to about 20%, about 8 to about 18 wt %, about 8 to about 15 wt %, about 8 to about 12 wt %, about 8 to about 10 wt %, about 10 to about 20%, about 10 to about 18 wt %, about 10 to about 15 wt %, about 10 to about 12 wt %, about 12 to about 20%, about 12 to about 18 wt %, or about 12 to about 15 wt %, $Al_2O_3$. In some embodiments, the glass or glass ceramic composition can comprise about 2, 3, 4, 5, 6, 7, 8, 9, 10, 11, 12, 13, 14, 15, 16, 17, 18, 19, or 20 wt % $Al_2O_3$.

In the glass and glass ceramics herein, $Li_2O$ aids in forming both petalite and lithium silicate crystal phases. In fact, to obtain petalite and lithium silicate as the predominant crystal phases, it is desirable to have at least about 7 wt % $Li_2O$ in the composition. Additionally, it has been found that once $Li_2O$ gets too high—greater than about 15 wt %—the composition becomes very fluid. In some embodied compositions, the glass or glass ceramic can comprise from about 5 wt % to about 20 wt % $Li_2O$. In other embodiments, the glass or glass ceramic can comprise from about 10 wt % to about 14 wt % $Li_2O$. In some embodiments, the glass or glass ceramic composition can comprise from about 5 to about 20 wt %, about 5 to about 18 wt %, about 5 to about 16 wt %, about 5 to about 14 wt %, about 5 to about 12 wt %, about 5 to about 10 wt %, about 5 to about 8 wt %, 7 to about 20 wt %, about 7 to about 18 wt %, about 7 to about 16 wt %, about 7 to about 14 wt %, about 7 to about 12 wt %, about 7 to about 10 wt %, 10 to about 20 wt %, about 10 to about 18 wt %, about 10 to about 16 wt %, about 10 to about 14 wt %, about 10 to about 12 wt %, 12 to about 20 wt %, about 12 to about 18 wt %, about 12 to about 16 wt %, about 12 to about 14 wt %, 14 to about 20 wt %, about 14 to about 18 wt %, about 14 to about 16 wt %, about 16 to about 20 wt %, about 16 to about 18 wt %, or about 18 to about 20 wt % $Li_2O$. In some embodiments, the glass or glass ceramic composition can comprise about 5, 6, 7, 8, 9, 10, 11, 12, 13, 14, 15, 16, 17, 18, 19, or 20 wt % $Li_2O$.

As noted above, $Li_2O$ is generally useful for forming the embodied glass ceramics, but the other alkali oxides tend to decrease glass ceramic formation and form an aluminosilicate residual glass in the glass-ceramic. It has been found that more than about 5 wt % $Na_2O$ or $K_2O$, or combinations thereof, leads to an undesirable amount of residual glass which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the compositions described herein have low amounts of non-lithium alkali oxides. In some embodiments, the glass or glass ceramic composition can comprise from about 0 to about 5 wt % $R_2O$, wherein R is one or more of the alkali cations Na and K. In some embodiments, the glass or glass ceramic composition can comprise from about 1 to about 3 wt % $R_2O$, wherein R is one or more of the alkali cations Na and K. In some embodiments, the glass or glass ceramic composition can comprise from 0 to about 5 wt %, 0 to 4 wt %, 0 to 3 wt %, 0 to about 2 wt %, 0 to about 1 wt %, >0 to about 5 wt %, >0 to about 4 wt %, >0 to about 3 wt %, >0 to about 2 wt %, >0 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $Na_2O$ or $K_2O$, or combinations thereof. In some embodiments, the glass or glass ceramic composition can comprise about 0, >0, 1, 2, 3, 4, or 5 wt % $R_2O$.

The glass and glass ceramic compositions can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body; however, if the concentration of $P_2O_5$ is too high, the devitrification, upon cooling during precursor glass forming, can be difficult to control. Embodiments can comprise from >0 to about 6 wt % $P_2O_5$. Other embodiments can comprise about 2 to about 4 wt % $P_2O_5$. Still other embodiments can comprise about 1.5 to about 2.5 wt % $P_2O_5$. Embodied compositions can comprise from 0 to about 6 wt %, 0 to about 5.5 wt %, 0 to about 5 wt %, 0 to about 4.5 wt %, 0 to about 4 wt %, 0 to about 3.5 wt %, 0 to about 3 wt %, 0 to about 2.5 wt %, 0 to about 2 wt %, 0 to about 1.5 wt %, 0 to about 1 wt %, >0 to about 6 wt %, >0 to about 5.5 wt %, >0 to about 5 wt %, >0 to about 4.5 wt %, >0 to about 4 wt %, >0 to about 3.5 wt %, >0 to about 3 wt %, >0 to about 2.5 wt %, >0 to about 2 wt %, >0 to about 1.5 wt %, >0 to about 1 wt %, about 0.5 to about 6 wt %, about 0.5 to about 5.5 wt %, about 0.5 to about 5 wt %, about 0.5 to about 4.5 wt %, about 0.5 to about 4 wt %, about 0.5 to about 3.5 wt, about 0.5 to about 3 wt %, about 0.5 to about 2.5 wt %, about 0.5 to about 2 wt %, about 0.5 to about 1.5 wt %, about 0.5 to about 1 wt %, about 1 to about 6 wt %, about 1 to about 5.5 wt %, about 1 to about 5 wt %, about 1 to about 4.5 wt %, about 1 to about 4 wt %, about 1 to about 3.5 wt %, about 1 to about 3 wt %, about 1 to about 2.5 wt %, about 1 to about 2 wt %, about 1 to about 1.5 wt %, about 1.5 to about 6 wt %, about 1.5 to about 5.5 wt %, about 1.5 to about 5 wt %, about 1.5 to about 4.5 wt %, about 1.5 to about 4 wt %, about 1.5 to about 3.5 wt %, about 1.5 to about 3 wt %, about 1.5 to about 2.5 wt %, about 1.5 to about 2 wt %, about 2 to about 6 wt %, about 2 to about 5.5 wt %, about 2 to about 5 wt %, about 2 to about 4.5 wt %, about 2 to about 4 wt %, about 2 to about 3.5 wt %, about 2 to about 3 wt %, about 2 to about 2.5 wt %, about 2.5 to about 6 wt %, about 2.5 to about 5.5 wt %, about 2.5 to about 5 wt %, about 2.5 to about 4.5 wt %, about 2.5 to about 4 wt %, about 2.5 to about 3.5 wt %, about 2.5 to about 3 wt %, about 3 to about 6 wt %, about 3 to about 5.5 wt %, about 3 to about 5 wt %, about 3 to about 4.5 wt %, about 3 to about 4 wt %, about 3 to about 3.5 wt %, about 3.5 to about 6 wt %, about 3.5 to about 5.5 wt %, about 3.5 to about 5 wt %, about 3.5 to about 4.5 wt %, about 3.5 to about 4 wt %, about 4 to about 6 wt %, about 4 to about 5.5 wt %, about 4 to about 5 wt %, about 4 to about 4.5 wt %, about 4.5 to about 6 wt %, about 4.5 to about 5.5 wt %, about 4.5 to about 5 wt %, about 5 to about 6 wt %, about 5 to about 5.5 wt %, or about 5.5 to about 6 wt % $P_2O_5$. In some embodiments, the glass or glass ceramic composition can comprise about 0, >0, 0.5, 1, 1.5, 2, 2.5, 3, 3.5, 4, 4.5, 5, 5.5, or 6 wt % $P_2O_5$.

In the glass and glass ceramics herein, it is generally found that $ZrO_2$ can improve the stability of $Li_2O$—$Al_2O_3$—$SiO_2$—$P_2O_5$ glass by significantly reducing glass devitrification during forming and lowering liquidus temperature. At concentrations above 8 wt %, $ZrSiO_4$ can form a primary liquidus phase at a high temperature, which significantly lowers liquidus viscosity. Transparent glasses can be formed when the glass contains over 2 wt % $ZrO_2$. The addition of $ZrO_2$ can also help decrease the petalite grain size, which aids in the formation of a transparent glass-ceramic. In some embodiments, the glass or glass ceramic composition can comprise from about 0.2 to about 15 wt % $ZrO_2$. In some embodiments, the glass or glass ceramic composition can be from about 2 to about 4 wt % $ZrO_2$. In some embodiments, the glass or glass ceramic composition can comprise from about 0.2 to about 15 wt %, about 0.2 to about 12 wt %, about 0.2 to about 10 wt %, about 0.2 to about 8 wt %, about 0.2 to 6 wt %, about 0.2 to about 4 wt %, 0.5 to about 15 wt %, about 0.5 to about 12 wt %, about 0.5 to about 10 wt %, about 0.5 to about 8 wt %, about 0.5 to 6 wt %, about 0.5 to about 4 wt %, 1 to about 15 wt %, about 1 to about 12 wt %, about 1 to about 10 wt %, about 1 to about 8 wt %, about 1 to 6 wt %, about 1 to about 4 wt %, 2 to about 15 wt %, about 2 to about 12 wt %, about 2 to about 10 wt %, about 2 to about 8 wt %, about 2 to 6 wt %, about 2 to about 4 wt %, about 3 to about 15 wt %, about 3 to about 12 wt %, about 3 to about 10 wt %, about 3 to about 8 wt %, about 3 to 6 wt %, about 3 to about 4 wt %, about 4 to about 15 wt %, about 4 to about 12 wt %, about 4 to about 10 wt %, about 4 to about 8 wt %, about 4 to 6 wt %, about 8 to about 15 wt %, about 8 to about 12 wt %, about 8 to about 10 wt %, about 10 to about 15 wt %, about 10 to about 12 wt %, or about 12 to about 15 wt % $ZrO_2$. In some embodiments, the glass or glass ceramic composition can comprise about 0.2, 0.5, 1, 2, 3, 4, 5, 6, 7, 8, 9, 10, 11, 12, 13, 14, or 15 wt % $ZrO_2$.

$B_2O_3$ is conducive to providing a precursor glass with a low melting temperature. Furthermore, the addition of $B_2O_3$ in the precursor glass and thus the glass-ceramics helps achieve an interlocking crystal microstructure and can also improve the damage resistance of the glass ceramic. When boron in the residual glass is not charge balanced by alkali oxides or divalent cation oxides, it will be in trigonal-coordination state (or three-coordinated boron), which opens up the structure of the glass. The network around these three-coordinated boron is not as rigid as tetrahedrally coordinated (or four-coordinated) boron. Without being bound by theory, it is believed that precursor glasses and glass ceramics that include three-coordinated boron can tolerate some degree of deformation before crack formation. By tolerating some deformation, the Vickers indentation crack initiation values are increased. Fracture toughness of the precursor glasses and glass ceramics that include three-coordinated boron may also be increased. Without being bound by theory, it is believed that the presence of boron in the residual glass of the glass ceramic (and precursor glass) lowers the viscosity of the residual glass (or precursor glass), which facilitates the growth of lithium silicate crystals, especially large crystals having a high aspect ratio. A greater amount of three-coordinated boron (in relation to four-coordinated boron) is believed to result in glass ceramics that exhibit a greater Vickers indentation crack initiation load. In some embodiments, the amount of three-coordinated boron (as a percent of total $B_2O_3$) may be about 40% or greater, 50% or greater, 75% or greater, about 85% or greater or even about 95% or greater. The amount of boron in general should be controlled to maintain chemical durability and mechanical strength of the cerammed bulk glass ceramic.

In one or more embodiments, the glasses and glass ceramic herein can comprise from 0 to about 10 wt % or from 0 to about 2 wt % $B_2O_3$. In some embodiments, the glass or glass ceramic composition can comprise from 0 to about 10 wt %, 0 to about 9 wt %, 0 to about 8 wt %, 0 to about 7 wt %, 0 to about 6 wt %, 0 to about 5 wt %, 0 to about 4 wt %, 0 0 to about 3 wt %, 0 to about 2 wt %, 0 to about 1 wt %, >0 to about 10 wt %, >0 to about 9 wt %, >0 to about 8 wt %, >0 to about 7 wt %, >0 to about 6 wt %, >0 to about 5 wt %, >0 to about 4 wt %, >0 to about 3 wt %, >0 to about 2 wt %, >0 to about 1 wt %, about 1 to about 10 wt %, about 1 to about 8 wt %, about 1 to about 6 wt %, about 1 to about 5 wt %, about 1 to about 4 wt %, about 1 to about 2 wt %, about 2 to about 10 wt %, about 2 to about 8 wt %, about 2 to about 6 wt %, about 2 to about 4 wt %, about 3 to about 10 wt %, about 3 to about 8 wt %, about 3 to about 6 wt %, about 3 to about 4 wt %, about 4 to about 5 wt %, about 5 wt % to about 8 wt %, about 5 wt % to about 7.5 wt %, about 5 wt % to about 6 wt %, or about 5 wt % to about 5.5 wt % $B_2O_3$. In some embodiments, the glass or glass ceramic composition can comprise about 0, >0, 1, 2, 3, 4, 5, 6, 7, 8, 9, or 10 wt % $B_2O_3$.

MgO can enter petalite crystals in a partial solid solution. In one or more embodiments, the glasses and glass ceramic herein can comprise from 0 to about 8 wt % MgO. In some embodiments, the glass or glass ceramic composition can comprise from 0 to about 8 wt %, 0 to about 7 wt %, 0 to about 6 wt %, 0 to about 5 wt %, 0 to about 4 wt %, 0 to about 3 wt %, 0 to about 2 wt %, 0 to about 1 wt %, about 1 to about 8 wt %, about 1 to about 7 wt %, about 1 to about 6 wt %, about 1 to about 5 wt %, about 1 to about 4 wt %, about 1 to about 3 wt %, about 1 to about 2 wt %, about 2 to about 8 wt %, about 2 to about 7 wt %, about 2 to about 6 wt %, about 2 to about 5 wt %, about 2 to about 4 wt %, about 2 to about 3 wt %, about 3 to about 8 wt %, about 3 to about 7 wt %, about 3 to about 6 wt %, about 3 to about 5 wt %, about 3 to about 4 wt %, about 4 to about 8 wt %, about 4 to about 7 wt %, about 4 to about 6 wt %, about 4 to about 5 wt %, about 5 to about 8 wt %, about 5 to about 7 wt %, about 5 to about 6 wt %, about 6 to about 8 wt %, about 6 to about 7 wt %, or about 7 wt % to about 8 wt % MgO. In some embodiments, the glass or glass ceramic composition can comprise about 0, >0, 1, 2, 3, 4, 5, 6, 7, or 8 wt % MgO.

ZnO can enter petalite crystals in a partial solid solution. In one or more embodiments, the glasses and glass ceramics herein can comprise from 0 to about 10 wt % ZnO. In some embodiments, the glass or glass ceramic composition can comprise from 0 to about 10 wt %, 0 to about 9 wt %, 0 to about 8 wt %, 0 to about 7 wt %, 0 to about 6 wt %, 0 to about 5 wt %, 0 to about 4 wt %, 0 to about 3 wt %, 0 to about 2 wt %, 0 to about 1 wt %, about 1 to about 10 wt %, about 1 to about 9 wt %, about 1 to about 8 wt %, about 1 to about 7 wt %, about 1 to about 6 wt %, about 1 to about 5 wt %, about 1 to about 4 wt %, about 1 to about 3 wt %, about 1 to about 2 wt %, about 2 to about 10 wt %, about 2 to about 9 wt %, about 2 to about 8 wt %, about 2 to about 7 wt %, about 2 to about 6 wt %, about 2 to about 5 wt %, about 2 to about 4 wt %, about 2 to about 3 wt %, about 3 to about 10 wt %, about 3 to about 9 wt %, about 3 to about 8 wt %, about 3 to about 7 wt %, about 3 to about 6 wt %, about 3 to about 5 wt %, about 3 to about 4 wt %, about 4 to about 10 wt %, about 4 to about 9 wt %, about 4 to about 8 wt %, about 4 to about 7 wt %, about 4 to about 6 wt %, about 4 to about 5 wt %, about 5 to about 10 wt %, about 5 to about 9 wt %, about 5 to about 8 wt %, about 5 to about 7 wt %, about 5 to about 6 wt %, about 6 to about 10 wt %, about 6 to about 9 wt %, about 6 to about 8 wt %, about 6 to about 7 wt %, about 7 to about 10 wt %, about 7 to about 9 wt %, about 7 wt % to about 8 wt %, about 8 to about 10 wt %, about 8 to about 9 wt %, or about 9 to about 10 wt % ZnO. In some embodiments, the glass or glass ceramic composition can comprise about 0, >0, 1, 2, 3, 4, 5, 6, 7, 8, 9, or 10 wt % ZnO.

In one or more embodiments, the glasses and glass ceramics herein can comprise from 0 to about 5 wt % $TiO_2$. In some embodiments, the glass or glass ceramic composition can comprise from 0 to about 5 wt %, 0 to about 4 wt %, 0 to about 3 wt %, 0 to about 2 wt %, 0 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $TiO_2$. In some embodiments, the glass or glass ceramic composition can comprise about 0, >0, 1, 2, 3, 4, or 5 wt % $TiO_2$.

In one or more embodiments, the glasses and glass ceramics herein can comprise from 0 to about 0.4 wt % $CeO_2$. In some embodiments, the glass or glass ceramic composition can comprise from 0 to about 0.4 wt %, 0 to about 0.3 wt %, 0 to about 0.2 wt %, 0 to about 0.1 wt %, about 0.1 to about 0.4 wt %, about 1 to about 0.3 wt %, about 1 to about 0.2 wt %, about 0.2 to about 0.4 wt %, about 0.2 to about 0.3 wt %, or about 0.3 to about 0.4 wt % $CeO_2$. In some embodiments, the glass or glass ceramic composition can comprise about 0, >0, 0.1, 0.2, 0.3, or 0.4 wt % $CeO_2$.

In one or more embodiments, the glasses and glass ceramics herein can comprise from 0 to about 0.5 wt % $SnO_2$. In some embodiments, the glass or glass ceramic composition can comprise from 0 to about 0.5 wt %, 0 to about 0.4 wt %, 0 to about 0.3 wt %, 0 to about 0.2 wt %, 0 to about 0.1 wt %, about 0.05 to about 0.5 wt %, 0.05 to about 0.4 wt %, 0.05 to about 0.3 wt %, 0.05 to about 0.2 wt %, 0.05 to about 0.1 wt %, about 0.1 to about 0.5 wt %, about 0.1 to about 0.4 wt %, about 0.1 to about 0.3 wt %, about 0.1 to about 0.2 wt %, about 0.2 to about 0.5 wt %, about 0.2 to about 0.4 wt %, about 0.2 to about 0.3 wt %, about 0.3 to about 0.5 wt %, about 0.3 to about 0.4 wt %, or about 0.4 to about 0.5 wt % $SnO_2$. In some embodiments, the glass or glass ceramic composition can comprise about 0, >0, 0.05, 0.1, 0.2, 0.3, 0.4, or 0.5 wt % $SnO_2$.

In some embodiments, the sum of the weight percentage of $P_2O_5$ and $ZrO_2$ in the glasses and glass ceramics disclosed herein can be greater than or equal to about 3 wt %, 4 wt %, or 5 wt % to increase nucleation. An increase in nucleation can lead to the production of finer grains.

In some embodiments, the glass-ceramic exhibits transparency (i.e., the glass-ceramic is transparent) over the visible light range. In some embodiments, transparency of the glass-ceramic can be achieved by producing crystals smaller than the wavelength of the interrogating wavelength of light and by matching the index of refraction of the residual glass with that of petalite (1.51) and lithium disilicate (1.55).

In some embodiments, the glass-ceramic material may have an average transmittance of 70% or more in the wavelength range of 400 nm to 700 nm through a 1.0 mm thick piece of the glass-ceramic material. In some embodiments, glass ceramic material may have an average transmittance of 75% or more, 80% or more, 85% or more, or 90% or more in the wavelength range of 400 nm to 700 nm through a 1.0 mm thick piece of the glass-ceramic material. The average transmittance in the wavelength range of 400 nm or 700 nm is calculated by measuring the transmittance of all wavelengths between 400 nm and 700 nm and averaging the measurements.

In some embodiments, the a transparent glass-ceramic having a thickness of 1 mm can have a transmittance of 90% of light (including surface reflection losses) over the wavelength range from about 400 nm to about 1,000 nm. In one or more embodiments, the average transmittance for a transparent glass-ceramic article is about 85% or greater, about 86% or greater, about 87% or greater, about 88% or greater, about 89% or greater, about 90% or greater, about 91% or greater, about 92% or greater, about 93% or greater (including surface reflection losses) of light over the wavelength range of about 400 nm to about 1000 nm for a glass-ceramic article having a thickness of 1 mm. In other embodiments, glass-ceramic may be translucent over the visible light range. In some embodiments a translucent glass-ceramic can have an average transmittance in a range from about 20% to less than about 85% of light over the wavelength range of about 400 nm to about 1000 nm for a glass-ceramic article having a thickness of 1 mm In embodiments where the glass-ceramic is translucent, the glass-ceramic can have a white color.

In some embodiments, the size of the grains in the glass-ceramic may affect the transparency or translucency. In some embodiments, the grains of transparent glass-ceramics may have a longest dimension of less than about 100 nm. In some embodiments, the grains of translucent glass-ceramics may have a longest dimension in a range from about 100 nm to about 500 nm. In some embodiments, the grains of transparent glass-ceramics may have an aspect ratio of about 2 or greater. In some embodiments, the grains of translucent glass-ceramics may have an aspect ratio of about 2 or less.

As a result of the raw materials and/or equipment used to produce the glass or glass ceramic composition of the present disclosure, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass or glass ceramic embodied herein include, but are not limited to, $Na_2O$, $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, sulfur-based compounds, such as sulfates, halogens, or combinations thereof.

In some embodiments, antimicrobial components may be added to the glass or glass ceramic composition. Antimicrobial components that may be added to the glass or glass ceramic include, but are not limited to, Ag, AgO, Cu, CuO, $Cu_2O$, and the like. In some embodiments, the concentrations of the antimicrobial components are kept at a level of about 3, 2, 1, or 0.5, >0 wt %. In some embodiments, the antimicrobial components is from >0 to about 3 wt %. In some embodiments, the antimicrobial components is from >0 to about 1 wt %.

In some embodiments, the glass or glass ceramic may further include a chemical fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5, >0 wt %. In some embodiments, the fining agent amount is from >0 to about 3 wt %. Chemical fining agents may also include $CeO_2$, $Fe_2O_3$, and other oxides of transition metals, such as $MnO_2$. These oxides may introduce unwanted color to the glass or glass ceramic via visible absorptions in their final valence state(s) in the glass, and thus, when present, their concentration is usually kept at a level of 0.5, 0.4, 0.3, 0.2, 0.1 or >0 wt %.

The glasses or glass ceramics can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, color, or forming attributes. The glass or glass ceramic can comprise from 0 to about 3 wt %, 0 to about 2 wt %, 0 to about 1 wt %, 0 to 0.5 wt %, or 0 to 0.1 wt % $SnO_2$.

In some embodiments, the glass or glass ceramic can be substantially free of $Sb_2O_3$, $As_2O_3$, or combinations thereof. For example, the glass or glass ceramic can comprise 0.05 weight percent or less of $Sb_2O_3$ or $As_2O_3$ or a combination thereof, the glass or glass ceramic may comprise 0 wt % of $Sb_2O_3$ or $As_2O_3$ or a combination thereof, or the glass or glass ceramic may be, for example, free of any intentionally added $Sb_2O_3$, $As_2O_3$, or combinations thereof.

Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 wt % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, or combinations thereof. In some embodiments, the glass can comprise from 0 to about 3 wt %, 0 to about 2 wt %, 0 to about 1 wt %, 0 to 0.5 wt %, 0 to 0.1 wt %, 0 to 0.05 wt %, or 0 to 0.01 wt % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$ or combinations thereof.

In some embodiments, the glasses described herein can be manufactured into sheets via processes, including but not limited to, slot draw, float, rolling, and other sheet-forming processes known to those skilled in the art. Alternatively, glass compositions may be formed via float or rolling processes known in the art.

In some embodiments, the glass compositions described here may be compatible with float-type forming processes with an adjustment of the liquidus viscosity. In some embodiments, the glass composition can have a liquidus viscosity of from about 1500 P to about 3000 P. In some embodiments, the glass composition can have a liquidus viscosity of about 1000, 1200, 1500, 2000, 2500, or 3000 P.

In some embodiments, the glass can have a coefficient of thermal expansion of about $50 \times 10^{-7}$/K or greater, about $50 \times 10^{-7}$/K or greater, about $60 \times 10^{-7}$/K or greater, about $61 \times 10^{-7}$/K or greater, about $62 \times 10^{-7}$/K or greater, about $63 \times 10^{-7}$/K or greater, about $64 \times 10^{-7}$/K or greater, about $65 \times 10^{-7}$/K or greater, about $66 \times 10^{-7}$/K or greater, about $67 \times 10^{-7}$/K or greater, about $68 \times 10^{-7}$/K or greater, about $69 \times 10^{-7}$/K or greater, about $70 \times 10^{-7}$/K or greater, about $71 \times 10^{-7}$/K or greater, about $72 \times 10^{-7}$/K or greater, about $73 \times 10^{-7}$/K or greater, about $74 \times 10^{-7}$/K or greater, about $75 \times 10^{-7}$/K or greater, about $76 \times 10^{-7}$/K or greater, about $77 \times 10^{-7}$/K or greater, about $78 \times 10^{-7}$/K or greater, about $79 \times 10^{-7}$/K or greater, or about $80 \times 10^{-7}$/K or greater.

In some embodiments, the glass ceramic has an equibiaxial flexural strength of about 300 MPa or greater, about 325 MPa or greater, about 350 MPa or greater, about 375 MPa or greater, about 400 MPa or greater, about 425 MPa or greater, or about 450 MPa or greater on a 1 mm thick glass-ceramic. The equibiaxial flexural strength can also be referred to as ring-on-ring (RoR) strength, which is measured according the procedure set forth in ASTM: C1499-05, with a few modifications to test fixtures and test conditions as outlined in U.S. Patent Publication No. 2013/0045375, at [0027], which is incorporated herein by reference. An abraded ring-on-ring (aRoR) strength can also be measured using the procedure described above if the glass-ceramic is first subjected to abrasion, typically with silicon carbide particles. Some embodiments also include a chemically-strengthenable glass ceramic with a petalite phase that leads to increased flexural strength. In such embodiments, the RoR strength may be about 500 MPa or greater, about 550 MPa or greater, about 600 MPa or greater, about 650 MPa or greater, about 700 MPa or greater, about 750 MPa or greater, or about 800 MPa or greater.

Some embodiments of the glass ceramics exhibit high fracture toughness and an inherent damage resistance. As mentioned above, some embodiments of the glass ceramic include interlocking lithium silicate crystals, which result in a high fracture toughness. The glass ceramic of one or more embodiment may include boron, which may be present as three-coordinated boron in the residual glass phase of the glass ceramic. In such embodiments, the three-coordinated boron is provided by the inclusion of $B_2O_3$ in the precursor glass. The three-coordinated boron provides a densification mechanism when the glass or glass ceramic is subjected to an indentation load.

In one or more embodiments, the glass ceramics exhibit a fracture toughness of about 1.0 $MPa \cdot m^{1/2}$ or greater, about 1.1 $MPa \cdot m^{1/2}$ or greater, 1.2 $MPa \cdot m^{1/2}$ or greater, 1.3 $MPa \cdot m^{1/2}$ or greater, 1.4 $MPa \cdot m^{1/2}$ or greater, 1.5 $MPa \cdot m^{1/2}$ or greater, 1.6 $MPa \cdot m^{1/2}$ or greater, 1.7 $MPa \cdot m^{1/2}$ or greater, 1.8 $MPa \cdot m^{1/2}$ or greater, 1.9 $MPa \cdot m^{1/2}$ or greater, or about 2.0 $MPa \cdot m^{1/2}$ In some embodiments, the fracture toughness is in the range from about 1 to about 2 $MPa \cdot m^{1/2}$. The fracture toughness may be measured using known methods in the art, for example, using a chevron notch short beam, according to ASTM C1421-10, "Standard Test Methods for Determination of Fracture Toughness of Advanced Ceramics at Ambient Temperature".

In one or more embodiments, the glass ceramics have high crack and scratch resistance by exhibiting a Vickers hardness. In some embodiments, a non-ion-exchanged glass ceramic exhibits a Vickers hardness in the range from about 600 to about 900 $kgf/mm^2$, about 600 to about 875 $kgf/mm^2$, about 600 to about 850 $kgf/mm^2$, about 600 to about 825 $kgf/mm^2$, about 600 to about 800 $kgf/mm^2$, about 600 to about 775 $kgf/mm^2$, about 600 to about 750 $kgf/mm^2$, about 600 to about 725 $kgf/mm^2$, about 600 to about 700 $kgf/mm^2$, from about 700 to about 900 $kgf/mm^2$, about 700 to about 875 $kgf/mm^2$, about 700 to about 850 $kgf/mm^2$, about 700 to about 825 $kgf/mm^2$, or about 700 to about 800 $kgf/mm^2$. In some embodiments, a Vickers hardness is 600 $kgf/mm^2$ or greater, 625 $kgf/mm^2$ or greater, 650 $kgf/mm^2$ or greater, 675 $kgf/mm^2$ or greater, 700 $kgf/mm^2$ or greater, 725 $kgf/mm^2$ or greater, 750 $kgf/mm^2$ or greater, 775 $kgf/mm^2$ or greater, 800 $kgf/mm^2$ or greater, 825 $kgf/mm^2$ or greater, 850 $kgf/mm^2$ or greater, 875 $kgf/mm^2$ or greater, or 900 $kgf/mm^2$ or greater. Vickers hardness may be measured using ASTM C1326 and C1327 (and its progeny, all herein incorporated by reference) "Standard Test Methods for Vickers Indentation Hardness of Advanced Ceramics," ASTM International, Conshohocken, PA, US. In some embodiments, the glass ceramics exhibit such Vickers indentation crack initiation load values after being chemically strengthened via ion exchange.

In some embodiments, the glass ceramics disclosed herein are not frangible upon being ion-exchanged. As used herein, the terms "frangible" and "frangibilty" refer to the energetic fracture of a glass ceramic plate or sheet, when subjected to a point impact by an object or a drop onto a solid surface with sufficient force to break the glass ceramic plate into multiple small pieces, with either multiple crack branching (i.e., greater than 5 multiple cracks branching from an initial crack) in the glass, ejection of pieces from their original location of at least two inches (about 5 cm), a fragmentation density of greater than about 5 fragments/cm² of the plate, or any combination of these three conditions. Conversely, a glass ceramic plate is deemed to be not frangible if it either does not break or breaks with less than five multiple cracks branching from an initial crack with pieces ejected less than two inches from their original location when subjected to a point impact by an object or a drop onto a solid surface with sufficient force to break the glass ceramic plate.

Figure 19:
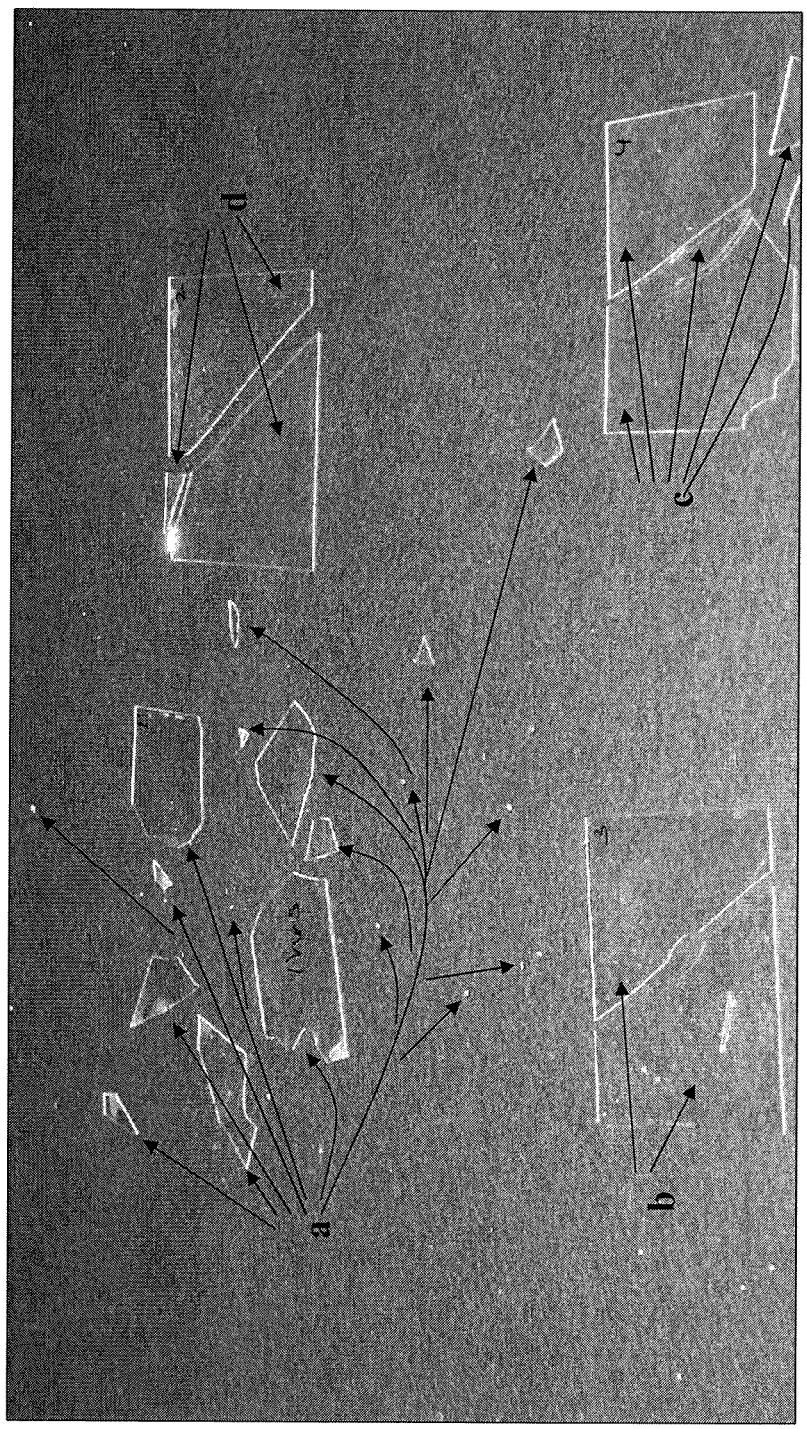
FIG. 19 is a photograph showing ion-exchanged glass-ceramic sheets with different break patterns.

Examples of frangible and non-frangible behavior observed for 5 cm×5 cm glass ceramic plates, each having a thickness of 0.5 mm, are shown in FIG. 19. Glass ceramic plate a exhibits frangible behavior, as evidenced by the multiple small pieces that have been ejected more than two inches, and a large degree of crack branching from the initial crack to produce the small pieces. In contrast to glass ceramic plate a, glass ceramic plates b, c, and d do not exhibit frangible behavior. In these instances, the glass ceramic plate breaks into a small number of large pieces that are not forcefully ejected 2 inches from their original location ("X" is the approximate center of glass plate a before fracture). Glass ceramic plate b has broken into two large pieces with no crack branching; glass ceramic plate c has broken into four pieces with two cracks branching from the initial crack; and glass ceramic plate d has broken into four pieces with two cracks branching from the initial crack.

In addition, all of the compositions and glasses and/or glass ceramics compositions are ion exchangeable by those methods widely known in the art. In typical ion exchange processes, smaller metal ions in the glass are replaced or "exchanged" by larger metal ions of the same valence within a layer that is close to the outer surface of the glass and/or glass ceramic. The replacement of smaller ions with larger ions creates a compressive stress within, the layer of the glass and/or glass ceramic. In one embodiment, the metal ions are monovalent alkali metal ions (e.g., $Na^+$, $K^+$, $Rb^+$, $Cs^+$ and the like), and ion exchange is accomplished by immersing the glass and/or glass ceramic in a bath comprising at least one molten salt of the larger metal ion that is to replace the smaller metal ion in the glass. Alternatively, other monovalent ions such as $Ag^+$, $Tl^+$, $Cu^+$, and the like may be exchanged for monovalent ions. The ion exchange process or processes that are used to strengthen the glass and/or glass ceramic can include, but are not limited to, immersion in a single bath or multiple baths of like or different compositions with washing and/or annealing steps between immersions. In one or more embodiments, the glasses and/or glass-ceramics may be ion exchanged by exposure to molten $NaNO_3$ at a temperature of about 430° C. In such embodiments, the Na+ ions replace some portion of the Li ions in the glass ceramic to develop a surface compressive layer and exhibit high crack resistance. The resulting compressive stress layer may have a depth (also referred to as a "depth of layer") of at least 100 μm on the surface of the glass in about 2 hours. In such embodiments, the depth-of-layer can be determined from the $Na_2O$ concentration profile. In other examples, embodiments may be ion exchanged by exposure to molten $KNO_3$ at a temperature of 410° C. for 2 hours to produce a compressive stress layer having a depth of layer of at least about 100 In some embodiments, the glass-ceramics may be ion exchanged to achieve a depth of layer of about 30 μm or greater, about 40 μm or greater, about 50 μm or greater, about 60 μm or greater, about 70 μm or greater, about 80 μm or greater, about 90 μm or greater, or about 100 μm or greater. In other embodiments the glasses are ion exchanged to achieve a central tension of at least 10 MPa. The development of this surface compression layer is beneficial for achieving a better crack resistance and higher flexural strength compared to non-ion-exchanged materials. The surface compression layer has a higher concentration of the ion exchanged into the glass-ceramic article in comparison to the concentration of the ion exchanged into the glass-ceramic article for the body (i.e., area not including the surface compression) of the glass-ceramic article.

In some embodiments, the glass-ceramic can have a surface compressive stress in a range from about 100 MPa to about 500 MPa, about 100 MPa to about 450 MPa, about 100 MPa to about 400 MPa, about 100 MPa to about 350 MPa, about 100 MPa to about 300 MPa, about 100 MPa to about 250 MPa, about 100 MPa to about 200 MPa, about 100 MPa to about 150 MPa, 150 MPa to about 500 MPa, about 150 MPa to about 450 MPa, about 150 MPa to about 400 MPa, about 150 MPa to about 350 MPa, about 150 MPa to about 300 MPa, about 150 MPa to about 250 MPa, about 150 MPa to about 200 MPa, 200 MPa to about 500 MPa, about 200 MPa to about 450 MPa, about 200 MPa to about 400 MPa, about 200 MPa to about 350 MPa, about 200 MPa to about 300 MPa, about 200 MPa to about 250 MPa, 250 MPa to about 500 MPa, about 250 MPa to about 450 MPa, about 250 MPa to about 400 MPa, about 250 MPa to about 350 MPa, about 250 MPa to about 300 MPa, 300 MPa to about 500 MPa, about 300 MPa to about 450 MPa, about 300 MPa to about 400 MPa, about 300 MPa to about 350 MPa, 350 MPa to about 500 MPa, about 350 MPa to about 450 MPa, about 350 MPa to about 400 MPa, 400 MPa to about 500 MPa, about 400 MPa to about 450 MPa, or about 450 MPa to about 500 MPa. In some embodiments, the glass-ceramic can have a surface compressive stress of about 100 MPa or greater, about 150 MPa or greater, about 200 MPa or greater, about 250 MPa or greater, about 300 MPa or greater, about 350 MPa or greater, about 400 MPa or greater, about 450 MPa or greater, or about 500 MPa or greater. Compressive stress and depth of compressive stress layer ("DOL") are measured using those means known in the art. DOL is determined by surface stress meter (FSM) using commercially available instruments such as the FSM-6000, manufactured by Luceo Co., Ltd. (Tokyo, Japan), or the like, and methods of measuring CS and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

In one or more embodiments, the processes for making the glass ceramic includes heat treating the precursor glasses at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). In some embodiments, the heat treatment can include (i) heating precursor glasses at a rate of 1-10° C./min to a glass pre-nucleation temperature: (ii) maintaining the crystallizable glasses at the glass pre-nucleation temperature for a time in a range from about ¼ hr to about 4 hr to produce pre-nucleated crystallizable glasses; (iii) heating the pre-nucleated crystallizable glasses at a rate of 1-10° C./min to nucleation temperature (Tn); (iv) maintaining the crystallizable glasses at the nucleation temperature for a time in the range from between about ¼ hr to about 4 hr to produce nucleated crystallizable glasses; (v) heating the nucleated crystallizable glasses at a rate in the range from about 1° C./min to about 10° C./min to a crystallization temperature (Tc); (vi) maintaining the nucleated crystallizable glasses at the crystallization temperature for a time in the range from about ¼ hr to about 4 hr to produce the glass ceramic described herein; and (vii) cooling the formed glass ceramic to room temperature. As used herein, the term crystallization temperature may be used interchangeably with ceram or ceramming temperature. In addition, the terms "ceram" or "ceramming" in these embodiments, may be used to refer to steps (v), (vi) and optionally (vii), collectively. In some embodiments, the glass pre-nucleation temperature can be 540° C., the nucleation temperature can be 600° C., and the crystallization temperature can be in a range from 630° C. to 730° C. In other embodiments, the heat treatment does not include maintaining the crystallizable glasses at a glass pre-nucleation temperature. Thus the can heat treatment may include (i) heating precursor glasses at a rate of 1-10° C./min to a nucleation temperature (Tn); (ii) maintaining the crystallizable glasses at the nucleation temperature for a time in the range from between about ¼ hr to about 4 hr to produce nucleated crystallizable glasses; (iii) heating the nucleated crystallizable glasses at a rate in the range from about 1° C./min to about 10° C./min to a crystallization temperature (Tc); (iv) maintaining the nucleated crystallizable glasses at the crystallization temperature for a time in the range from about ¼ hr to about 4 hr to produce the glass ceramic described herein; and (v) cooling the formed glass ceramic to room temperature. The terms "ceram" or "ceramming", in the preceding embodiments, may be used to refer to steps (iii), (iv) and optionally (v), collectively. In some embodiments, the nucleation temperature can be about 700° C., and the crystallization temperature can be about 800° C. In some embodiments, the higher the crystallization temperature, the more β-spodumene ss is produced as a minor crystalline phase.

Temperature-temporal profile of heat treatment steps of heating to the crystallization temperature and maintaining the temperature at the crystallization temperature in addition to precursor glass compositions, are judiciously prescribed so as to produce one or more of the following desired attributes: crystalline phase(s) of the glass ceramic, proportions of one or more major crystalline phases and/or one or more minor crystalline phases and residual glass, crystal phase assemblages of one or more predominate crystalline phases and/or one or more minor crystalline phases and residual glass, and grain sizes or grain size distributions among one or more major crystalline phases and/or one or more minor crystalline phases, which in turn may influence the final integrity, quality, color, and/or opacity, of resultant formed glass ceramic.

The resultant glass ceramic can be provided as a sheet, which can then be reformed by pressing, blowing, bending, sagging, vacuum forming, or other means into curved or bent pieces of uniform thickness. Reforming can be done before thermally treating or the forming step can also serve as a thermal treatment step where both forming and thermally treating are performed substantially simultaneously.

In yet other embodiments, the precursor glass compositions used to form the glass ceramic can be formulated, for example, so that the glass ceramic is capable of being chemically strengthened using one or more ion exchange techniques. In these embodiments, ion exchange can occur by subjecting one or more surfaces of such glass ceramic to one or more ion exchange baths, having a specific composition and temperature, for a specified time period to impart to the one or more surfaces with compressive stress layer(s). The compressive stress layer can include one or more average surface compressive stress (CS), and/or one or more depths of layer.

Methods of making containers discussed herein may include forming a glass material and ceramming the glass material to achieve desired mechanical properties while maintaining optical properties of the glass material. In some embodiments, the method may include molding a glass material into a glass container and ceramming the glass container at a ceramming temperature to crystalize the glass material into a glass-ceramic material, thereby forming a glass-ceramic container. In some embodiments, the method may be devoid of an ion-exchange process, a tempering process, and a lamination process. In some embodiments, the method may include an ion-exchange process. In such embodiments, the glass ceramic material has a first fracture toughness before the ion-exchange process and a second fracture toughness greater than the first fracture toughness after the ion-exchange process.

In some embodiments, the ceramming temperature may be in the range of 500 degrees C. to 900 degrees C. In some embodiments, the ceramming temperature may be about 500 degrees C., 550 degrees C., 600 degrees C., 650 degrees C., 700 degrees C., 750 degrees C., 800 degrees C., 850 degrees C., 900 degrees C., or within any range having two of these values as endpoints. In some embodiments, a glass container may be held at the ceramming temperature for about 4 hours to achieve desired mechanical properties while maintaining optical properties of the glass material.

In some embodiments, a glass ceramic container may be made by a method including molding a glass material into a single monolithic glass container and ceramming the glass container at a ceramming temperature to crystalize the glass material into a glass-ceramic material, thereby forming a glass-ceramic container having at least one, or all, of the following characteristics: (a) transparency in the visible light spectrum (400 nm to 700 nm), (b) a fracture toughness of 1 MPa*m^½ or more, and (c) an exterior surface of the circumferential sidewall is not under compressive stress. In some embodiments, the method may be devoid of a tempering process such that the glass-ceramic container comprises a non-tempered glass ceramic-material.

EXAMPLES

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in wt % on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Example glass and glass ceramic compositions (in terms of wt %) and properties for achieving transparent glass ceramics are set forth in the Table 2 and are determined in accordance with techniques conventional in the glass art. Precursor glasses are formed having the Compositions 1-16 listed in Table 2. The precursor glasses are then subjected to a ceramming cycle having a glass homogenization hold at 540° C. for 4 hours, a nucleation hold at 600° C. for 4 hours, and a crystallization hold at a temperature in a range from 630 to 730° C. for 4 hours. The following nomenclature is used in Table 2 to describe the ceramming cycle: glass homogenization temperature-hold time/nucleation temperature-hold time/crystallization temperature-hold time.

The liquidus temperature is the temperature where the first crystal is observed in a standard gradient boat liquidus measurement (ASTM C829-81 and it progeny). This involves placing crushed glass particles in a platinum boat, placing the boat in a furnace having a region of gradient temperatures, heating the boat in an appropriate temperature region for 24 or 72 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The liquidus viscosity in poises is determined from the liquidus temperature and the coefficients of the Fulcher equation.

TABLE 2

| Composition | 1 | 2 | 3 | 4 | 5 | 6 | 7 | 8 |
|---|---|---|---|---|---|---|---|---|
| $SiO_2$ (wt %) | 78.3 | 78.3 | 78.3 | 78.3 | 78.3 | 78.3 | 78.3 | 78.3 |
| $Al_2O_3$ (wt %) | 7.5 | 8.1 | 8.7 | 8.1 | 8.1 | 8.1 | 8.1 | 8.1 |
| $B_2O_3$ (wt %) | 0.0 | 0.2 | 0.4 | 1.0 | 2.0 | 4.0 | 5.0 | 6.0 |
| $Li_2O$ (wt %) | 12.5 | 11.9 | 11.3 | 11.9 | 11.9 | 11.9 | 11.9 | 11.9 |
| $Na_2O$ (wt %) | 1.7 | 1.7 | 1.7 | 1.7 | 1.7 | 1.7 | 1.7 | 1.7 |
| $K_2O$ (wt %) | 0.0 | 0.0 | 0.0 | 0.0 | 0.0 | 0.0 | 0.0 | 0.0 |
| ZnO (wt %) | 0.0 | 0.0 | 0.0 | 0.0 | 0.0 | 0.0 | 0.0 | 0.0 |
| $ZrO_2$ (wt %) | 4.0 | 4.0 | 4.0 | 4.0 | 4.0 | 4.0 | 4.0 | 4.0 |
| $P_2O_5$ (wt %) | 2.0 | 2.2 | 2.4 | 2.2 | 2.2 | 2.2 | 2.2 | 2.2 |
| Ceramming cycle | 540° C.-4 hr/600° C.-4 hr/730° C.-4 hr | 540° C.-4 hr/600° C.-4 hr/730° C.-4 hr | 540° C.-4 hr/600° C.-4 hr/710° C.-4 hr | 540° C.-4 hr/600° C.-4 hr/690° C.-4 hr | 540° C.-4 hr/600° C.-4 hr/650° C.-4 hr | 540° C.-4 hr/600° C.-4 hr/630° C.-4 hr | 540° C.-4 hr/600° C.-4 hr/630° C.-4 hr | 540° C.-4 hr/600° C.-4 hr/630° C.-4 hr |
| Phase assemblage | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate |
| Appearance | Slight hazy, transparent | Clear, transparent | Slight hazy, transparent | Clear, transparent | Clear, transparent | Slight hazy, transparent | Slight hazy, transparent | Slight hazy, transparent |
| Liquidus temperature (° C.) | 1030 | 1050 | 1070 | — | — | — | — | — |
| Liquidus viscosity (poise) | 3700 | 3800 | 3800 | — | — | — | — | — |

| Composition | 9 | 10 | 11 | 12 | 13 | 14 | 15 | 16 |
|---|---|---|---|---|---|---|---|---|
| $SiO_2$ (wt %) | 76.3 | 74.3 | 72.3 | 70.3 | 78.3 | 78.3 | 78.3 | 78.3 |
| $Al_2O_3$ (wt %) | 10.1 | 12.1 | 14.1 | 16.1 | 8.1 | 8.1 | 8.1 | 8.1 |
| $B_2O_3$ (wt %) | 0.2 | 0.2 | 0.2 | 0.2 | 2.0 | 2.0 | 2.0 | 2.0 |
| $Li_2O$ (wt %) | 11.9 | 11.9 | 11.9 | 11.9 | 11.9 | 11.9 | 11.9 | 11.9 |
| $Na_2O$ (wt %) | 1.7 | 1.7 | 1.7 | 1.7 | 0.0 | 0.0 | 0.0 | 0.0 |
| $K_2O$ (wt %) | 0.0 | 0.0 | 0.0 | 0.0 | 1.5 | 3.0 | 0.0 | 0.0 |
| ZnO (wt %) | 0.0 | 0.0 | 0.0 | 0.0 | 0.0 | 0.0 | 1.5 | 3.0 |
| $ZrO_2$ (wt %) | 4.0 | 4.0 | 4.0 | 4.0 | 4.0 | 4.0 | 4.0 | 4.0 |
| $P_2O_5$ (wt %) | 2.2 | 2.2 | 2.2 | 2.2 | 2.2 | 2.2 | 2.2 | 2.2 |
| Ceramming cycle | 540° C.-4 hr/600° C.-4 hr/710° C.-4 hr | 540° C.-4 hr/600° C.-4 hr/710° C.-4 hr | 540° C.-4 hr/600° C.-4 hr/710° C.-4 hr | 540° C.-4 hr/600° C.-4 hr/710° C.-4 hr | 540° C.-4 hr/600° C.-4 hr/690° C.-4 hr | 540° C.-4 hr/600° C.-4 hr/690° C.-4 hr | 540° C.-4 hr/600° C.-4 hr/690° C.-4 hr | 540° C.-4 hr/600° C.-4 hr/690° C.-4 hr |
| Phase assemblage | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate |
| Appearance | Slight haze, transparent | Hazy, transparent | Translucent white | Translucent creamy white | Clear, transparent | Slight hazy, transparent | Slight hazy, transparent | Translucent white |
| Liquidus temperature (° C.) | — | — | — | — | — | — | — | — |

TABLE 2-continued

| Liquidus viscosity (poise) | — | — | — | — | — | — | — | — |

Figure 10:
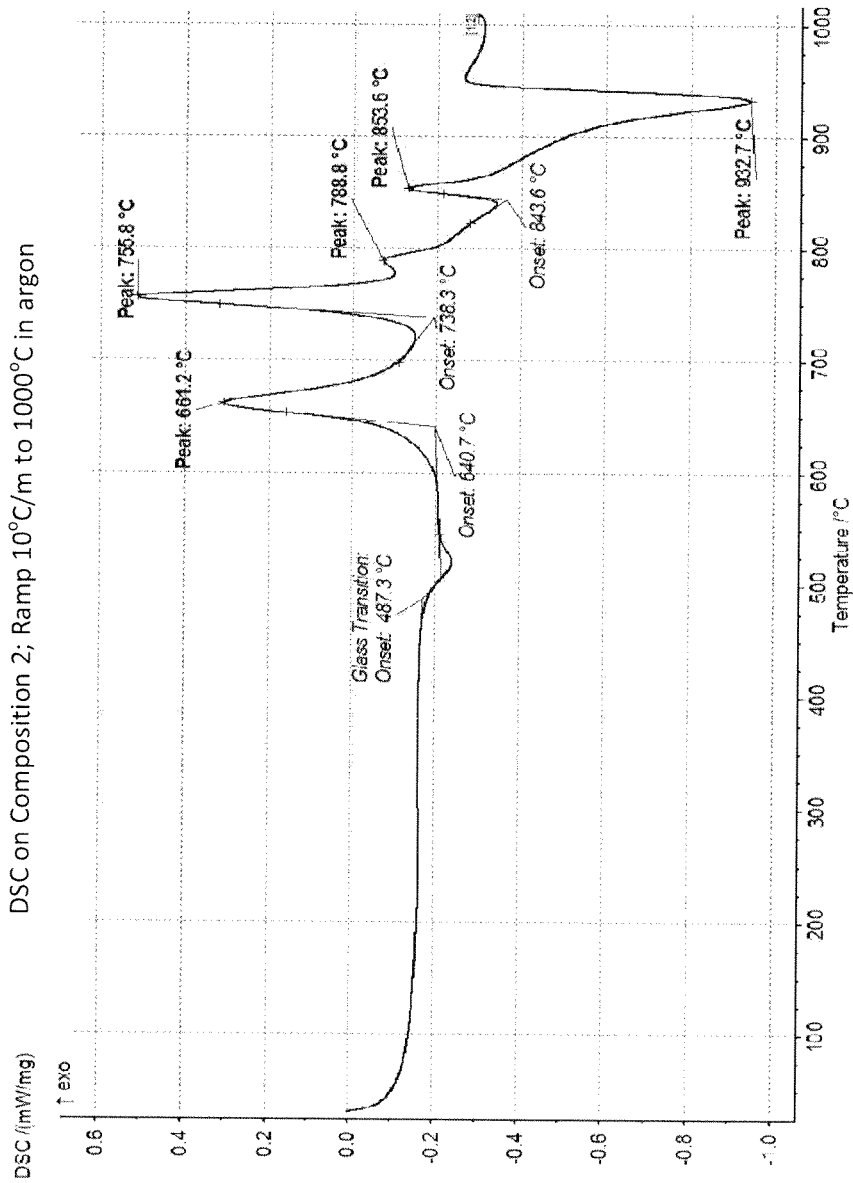
FIG. 10 is a plot of a differential calorimetry (DSC) trace for an exemplary glass-ceramic composition.

Several tests are done on Composition 2 after ceramming to determine a variety of properties for the glass-ceramic. As shown in FIG. 10, a differential scanning calorimetry (DSC) trace is performed plotting DSC/(mW/mg) vs. temperature in degrees Celsius. The trace is used to show that a fine-grained microstructure can be achieved by ceramming at low temperatures relative to crystallization temperatures.

Figure 11:
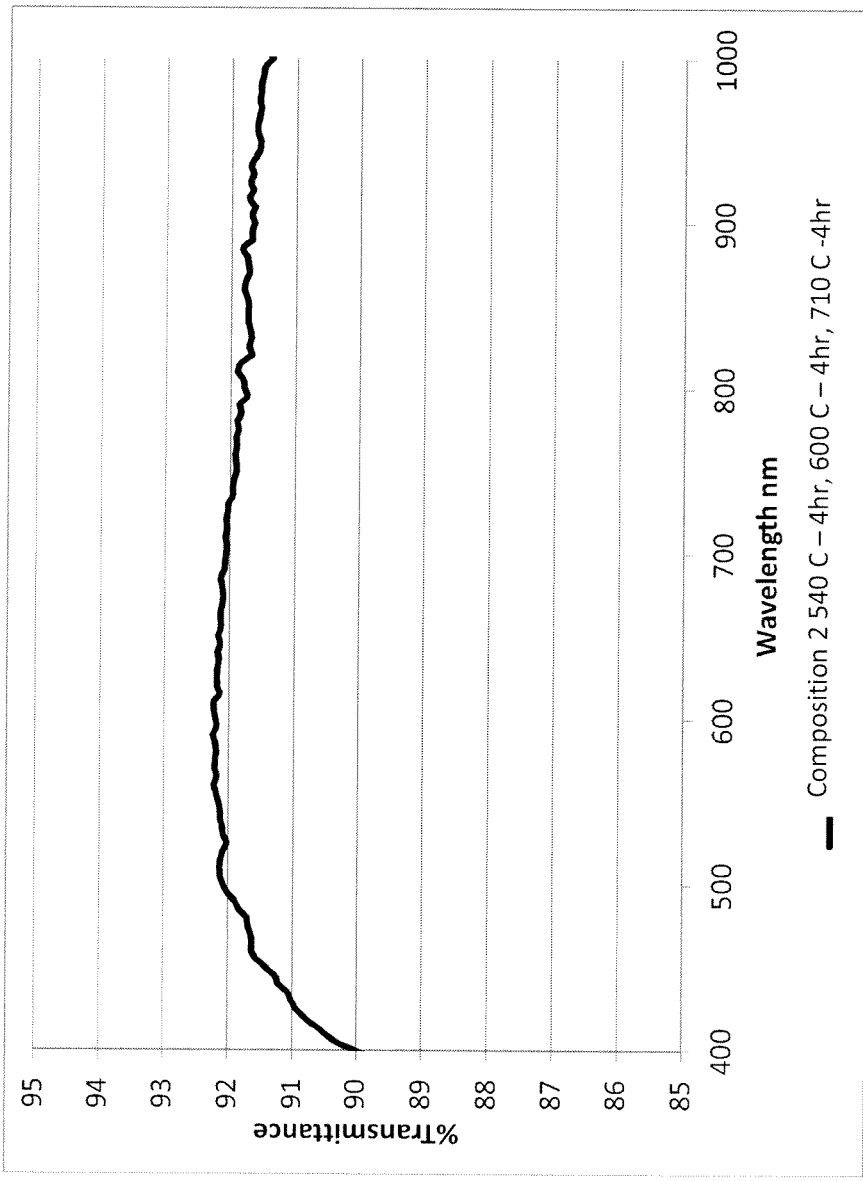
FIG. 11 is a plot of the transmittance of an exemplary glass-ceramic composition for light having a wavelength from 400 nm to 1,000 nm at a sample thickness of 1 mm.

The transmittance of a glass-ceramic slide of Composition 2 having a thickness of 1 mm is measured for light having a wavelength from 400 nm to 1,000 nm. As shown in FIG. 11, the average transmittance of the glass-ceramic in the visible light wavelength is greater than 90%.

Figure 12A:
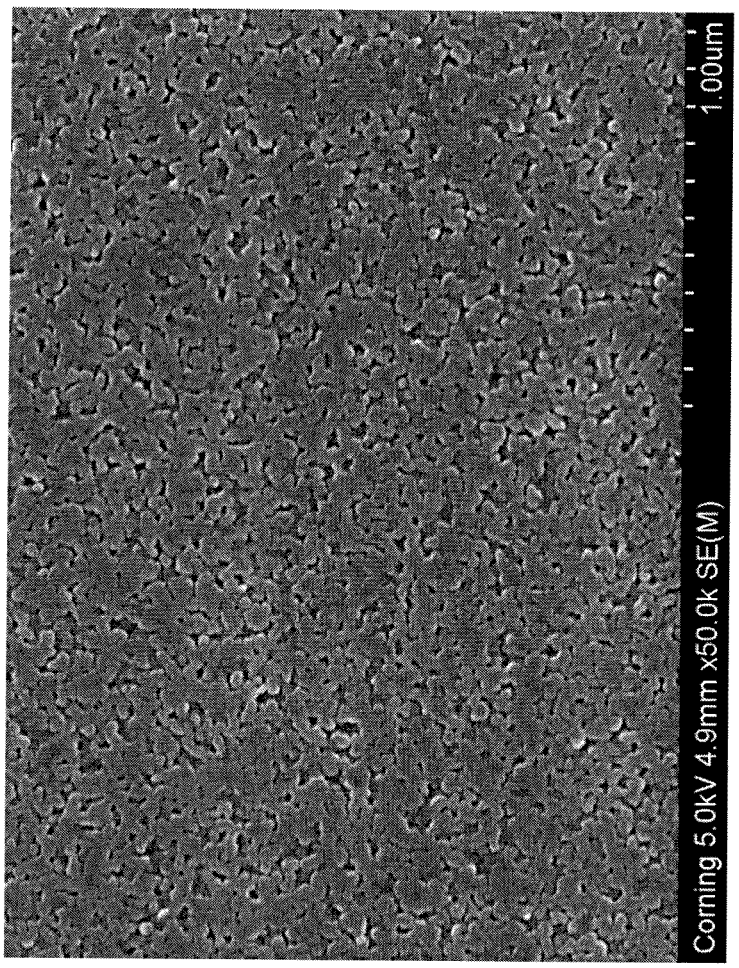
FIG. 12A is a scanning electron microscope (SEM) image of an exemplary glass-ceramic composition on a 200 nm scale.
Figure 12B:
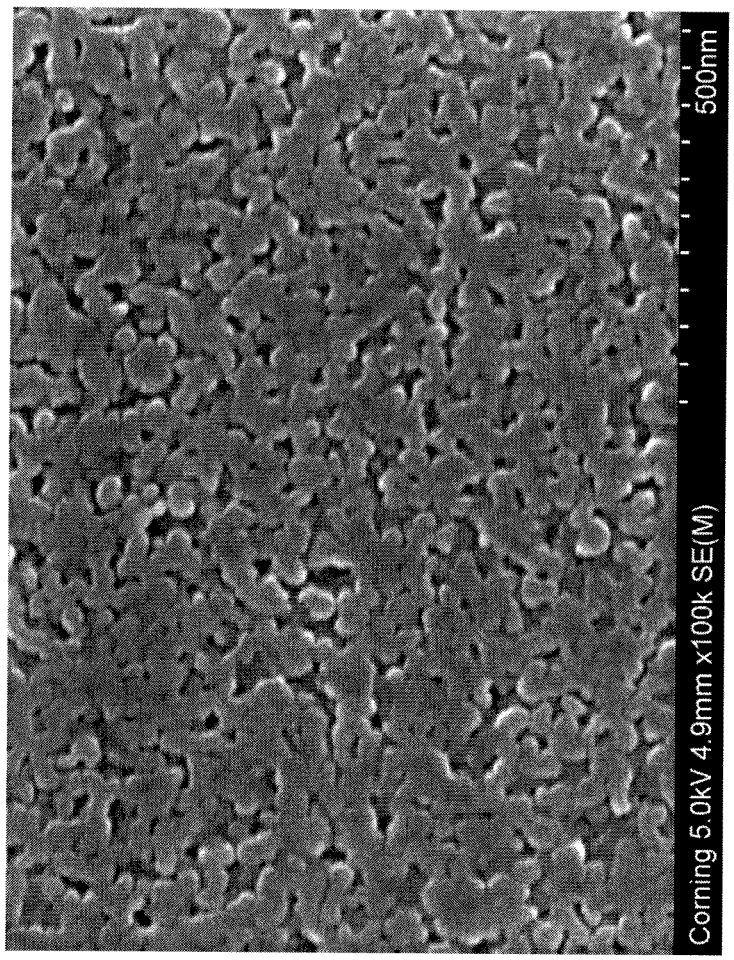
FIG. 12B is a scanning electron microscope (SEM) image of an exemplary glass-ceramic composition on a 100 nm scale.

A sample of glass-ceramic Composition 2 is observed using a scanning electron microscope (SEM) to determine the grain size of the petalite. FIG. 12A shows the SEM on a 200 nm scale and FIG. 12B shows the SEM on a 100 nm scale. The petalite grains are on the order of 50 to 100 nm. The fineness of the grains is believed to contribute to the transparency of the glass-ceramic evidenced in FIG. 11.

Figure 13:
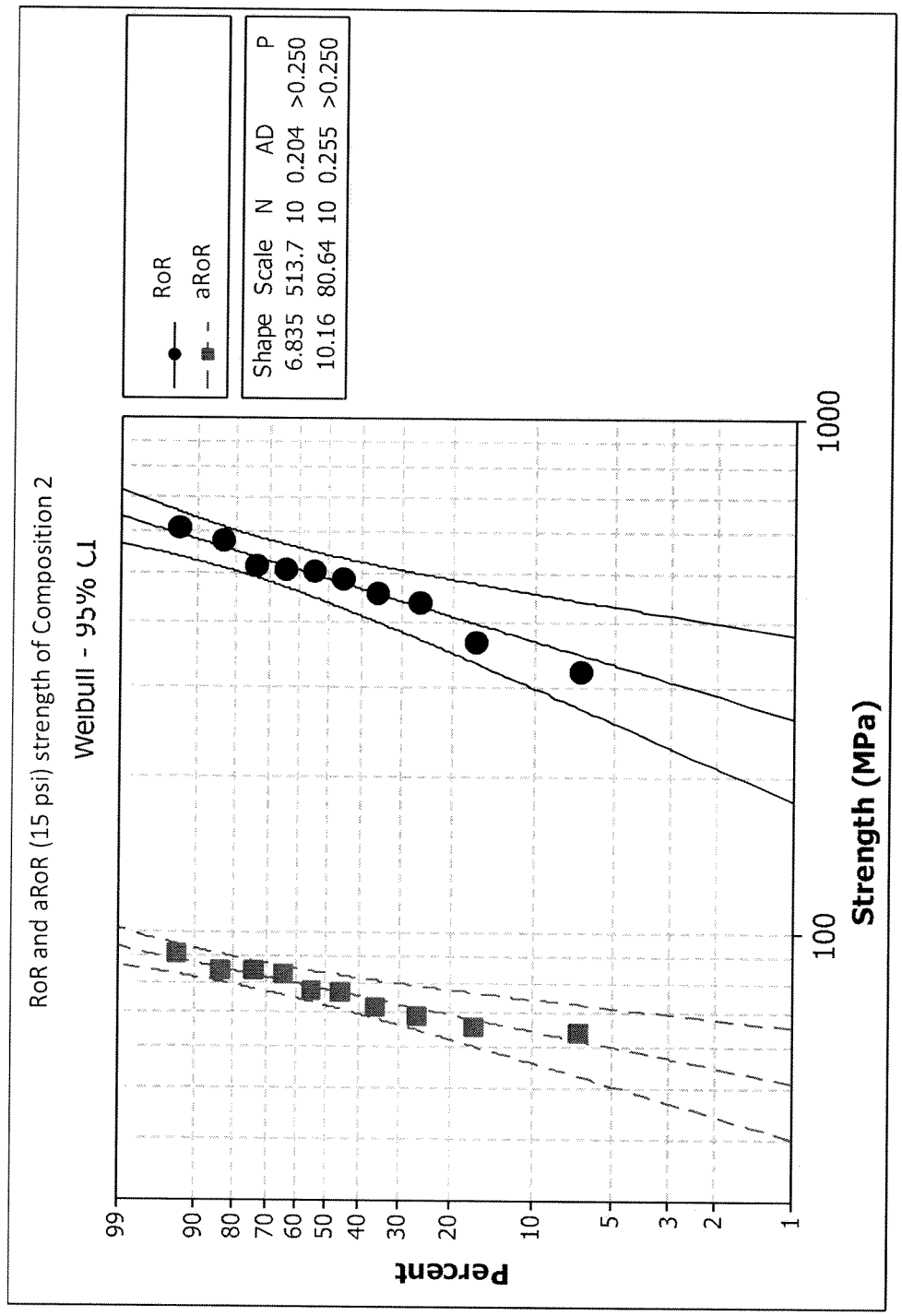
FIG. 13 shows the results of a ring-on-ring (RoR) test and an abraded ring-on-ring (aRoR) test of an exemplary non-ion-exchanged glass-ceramic composition.

Two 50 mm by 50 mm by 1 mm samples of glass-ceramic Composition 2 are subjected to a ring-on-ring test as described above to determine the strength of the samples. One sample is subjected to abrasion (15 psi) and one sample is not. FIG. 13 shows the results of the ring-on-ring test. A strength of 514 MPa was achieved for the ring-on-ring test.

The fracture toughness of a sample of glass-ceramic Composition 2 is measured using chevron notched short beam measurements. The fracture toughness is found to be 1.13 MPa·m$^{1/2}$.

The hardness of a sample of an embodied glass-ceramic composition is measured to determine the Vickers hardness as described above using a Model 5948 MicroTester, available from Instron. The Vickers hardness is found to be approximately 750 kgf/mm$^2$.

Figure 14:
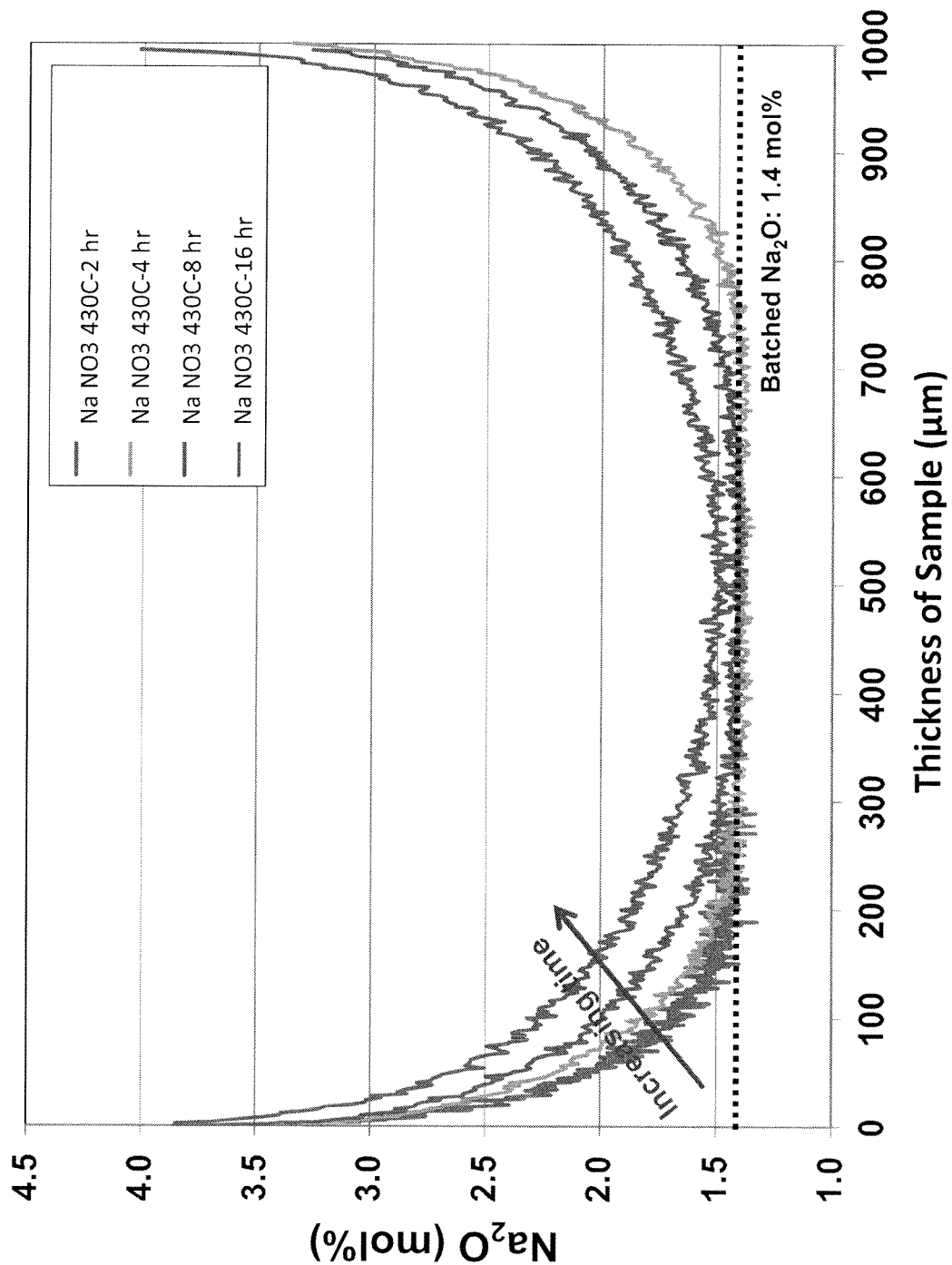
FIG. 14 shows a plot of concentration of $Na_2O$ in mole percent vs. thickness of the sample for an exemplary glass-ceramic composition.

An embodied glass-ceramic of Composition 2 is subjected to an ion-exchange process wherein the sample was placed in a molten NaNO$_3$ bath at 430° C. for 2 hours, 4 hours, 8 hours, and 16 hours. As shown in FIG. 14, a depth of layer of over 100 µm is achieved. FIG. 14 also shows a plot of the concentration of Na$_2$O in mole percent vs. thickness of the sample for each ion-exchange treatment. As can be seen, the depth of layer increases with increasing duration of the ion-exchange treatment. Also, a parabolic Na$_2$O concentration is achieved after ion-exchanging for 16 hours.

Figure 15:
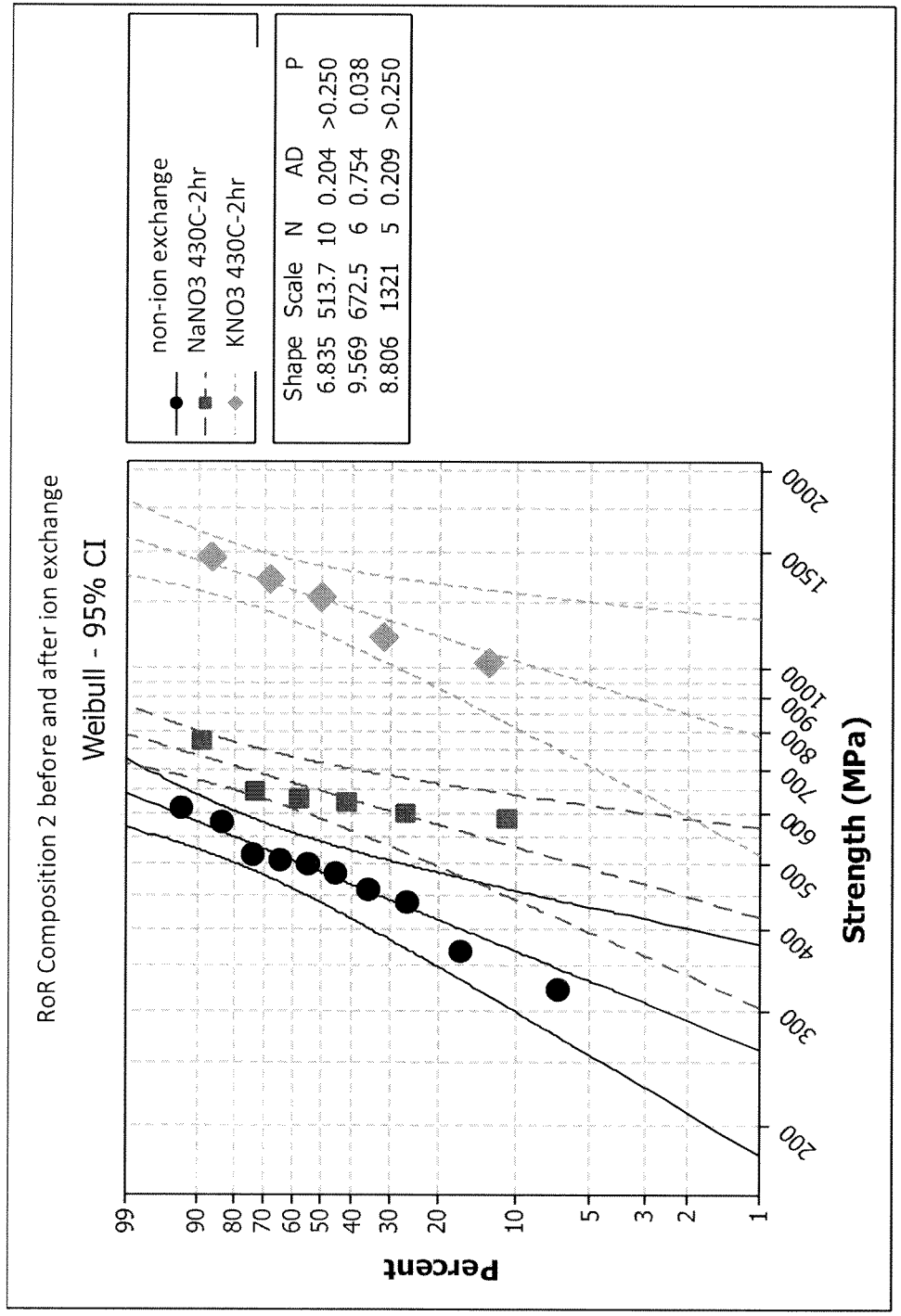
FIG. 15 shows the results of a RoR test of an exemplary glass-ceramic composition before and after ion-exchanging.

Two 50 mm by 50 mm by 1 mm samples of an embodied glass-ceramic of Composition 2 are ion-exchanged. One sample is ion-exchanged in a molten NaNO$_3$ bath at 430° C. for 2 hours and the other sample is ion-exchanged in a molten KNO$_3$ bath at 430° C. for 2 hours. The two ion-exchanged samples and a non-ion-exchanged 50 mm by 50 mm by 1 mm sample of glass-ceramic of Composition 2 are subjected to a ring-on-ring test as described above. The results are shown in FIG. 15. The strength of the glass-ceramic has an approximately 30% increase after ion-exchanging with NaNO$_3$ and approximately doubled after ion-exchanging with KNO$_3$. It is believed that ion-exchanging with a KNO$_3$ bath results in a greater depth-of-layer (DOL) for the compressive stress layer formed on the surface of the sample during ion exchange.

Figure 16:
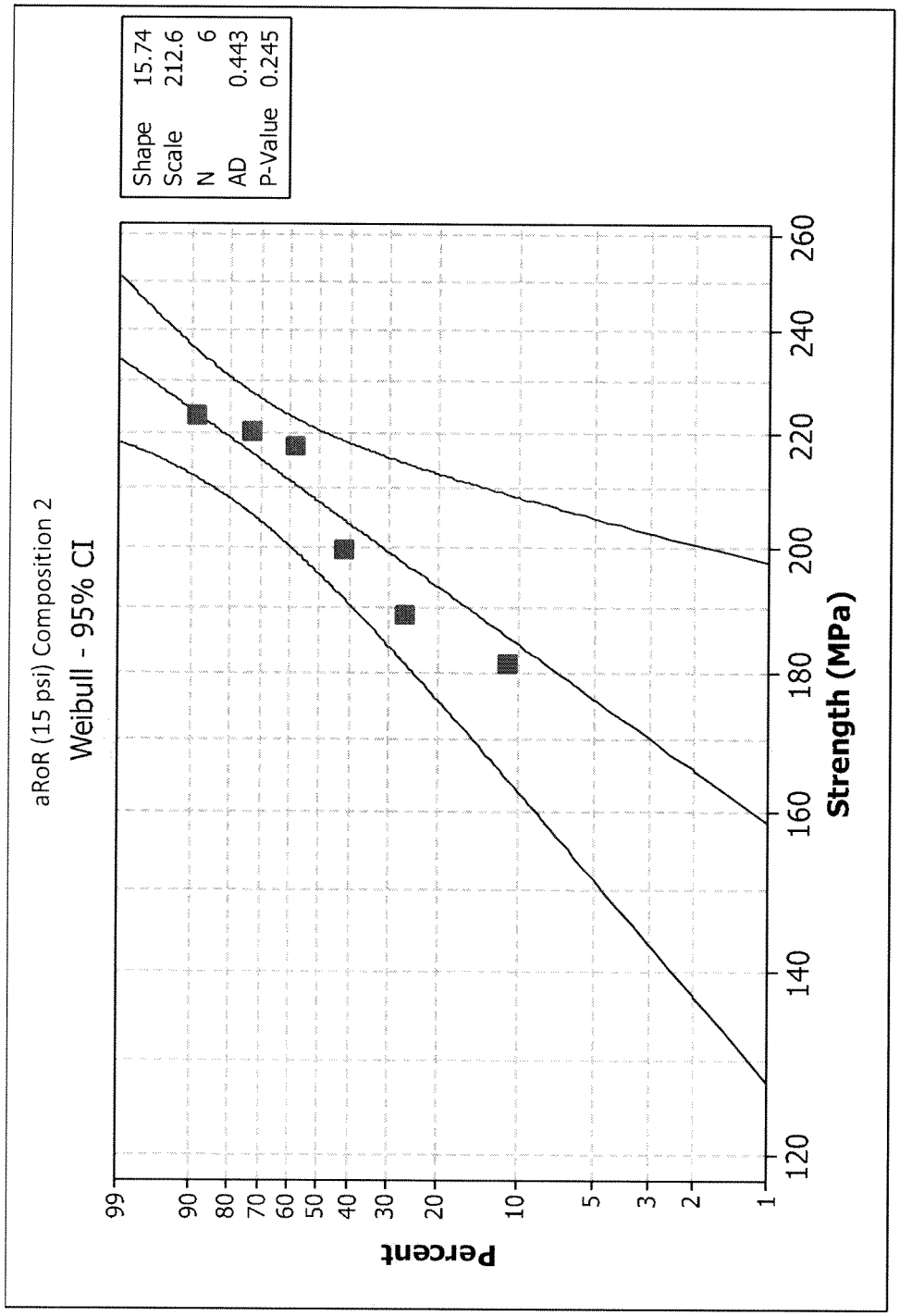
FIG. 16 shows the results of an aRoR test of an exemplary glass-ceramic composition that has been ion-exchanged.

A 50 mm by 50 mm by 1 mm sample of glass-ceramic of Composition 2 is ion-exchanged in a molten NaNO$_3$ bath at 430° C. for 2 hours. A 50 mm by 50 mm by 1 mm sample of glass A is ion-exchanged in a molten KNO$_3$ bath at 420° C. for 5.5 hours. A 50 mm by 50 mm by 1 mm sample of glass B is ion-exchanged in a 32% KNO$_3$ molten bath at 540° C. for 8 hours followed by ion-exchanging in a 100% KNO$_3$ molten bath at 390° C. for 15 mins. The samples are all abraded under 15 psi and subjected to an abraded ring-on-ring test as described above. The results are shown in FIG. 16. The glass-ceramic has a higher strength than glass A and has a strength approaching that of glass B. Thus the ion-exchanged glass ceramics embodied herein can be just as strong or stronger than ion-exchanged glass.

Figure 17:
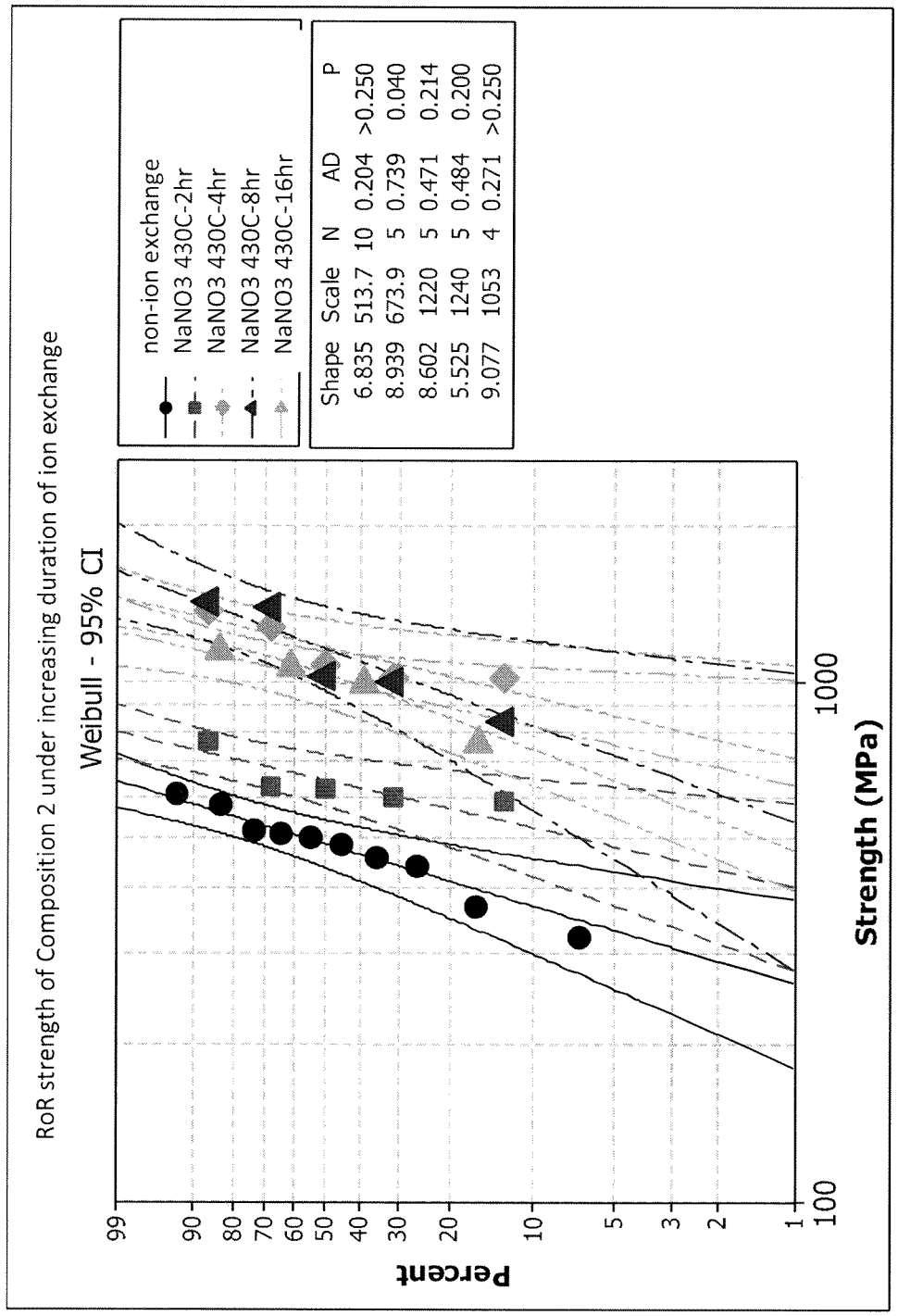
FIG. 17 shows the results of a RoR test of an exemplary glass-ceramic composition ion-exchanged for different durations of time.

50 mm by 50 mm by 1 mm samples of glass-ceramic of Composition 2 are ion-exchanged in a molten NaNO$_3$ bath at 430° C. for 2 hours, 4 hours, 8 hours, and 16 hours. The ion-exchanged samples are then subjected to a ring-on-ring test as described above as well as a non-ion-exchanged glass-ceramic sample of Composition 2. The results are shown in FIG. 17. The strength of the glass-ceramic increases based on the duration of the ion-exchange.

Figure 18:
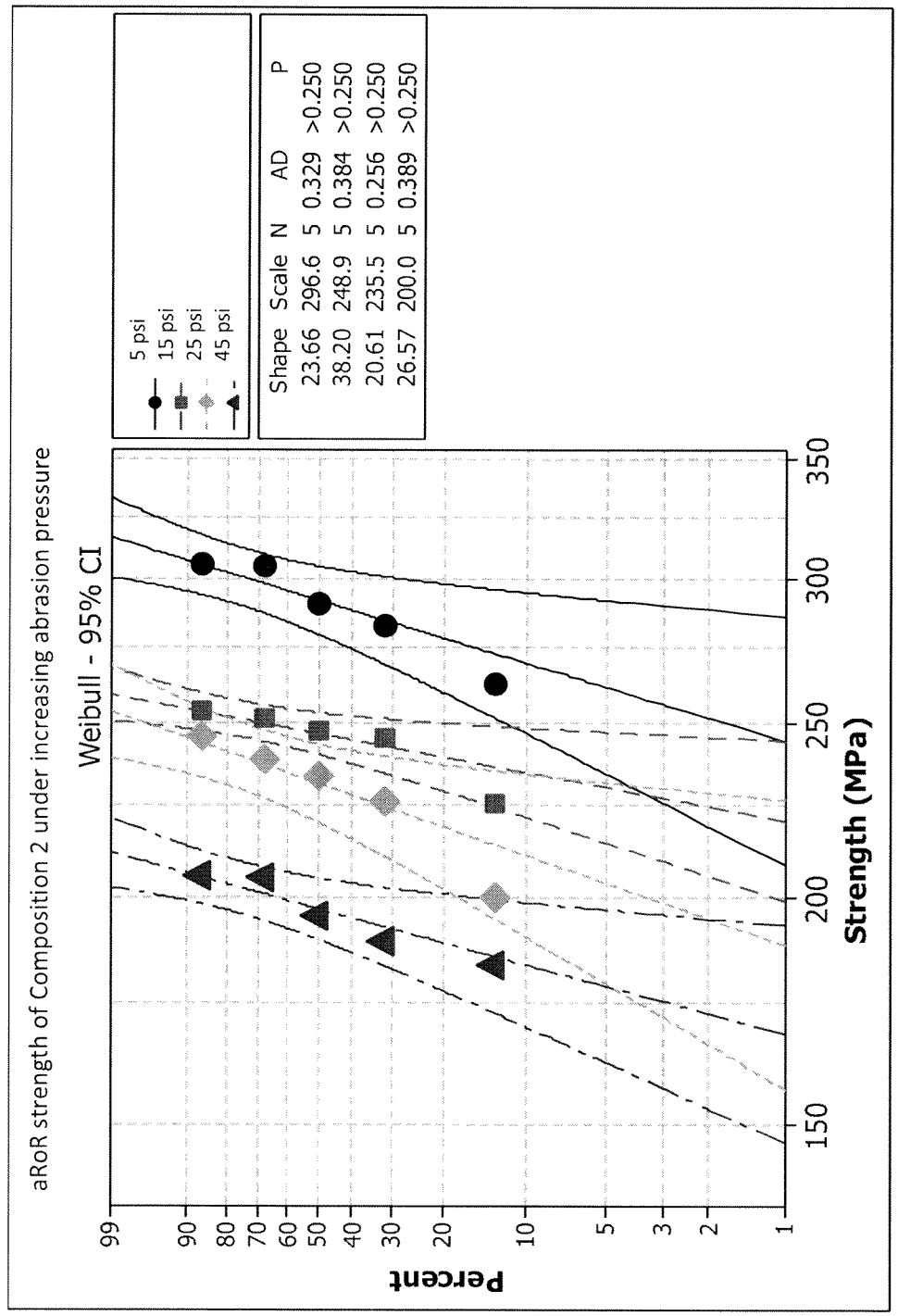
FIG. 18 shows the results of an aRoR test of an exemplary glass-ceramic composition that has been ion-exchanged and abraded under different pressures.

50 mm by 50 mm by 1 mm samples of glass-ceramic of Composition 2 are ion-exchanged in a molten NaNO$_3$ bath at 430° C. for 16 hours. The samples are abraded under 15 psi, 25 psi, or 45 psi and subjected to an abraded ring-on-ring test as described above. The results are shown in FIG. 18. The samples abraded under 15 psi have a load failure of about 253 MPa, the samples abraded under 25 psi have a load failure of about 240 MPa, and the samples abraded under 45 psi have a load failure of about 201 MPa.

Example 2

Example glass and glass ceramic compositions (in terms of wt %) and properties for achieving translucent glass ceramics are set forth in the Table 3 and are determined in accordance with techniques conventional in the glass art. Precursor glasses are formed having the Compositions 17-29 listed in Table 3. The precursor glasses are then subjected to a ceramming cycle indicated in Table 3 below.

TABLE 3

| Composition | 17 | 18 | 19 | 20 | 21 | 22 | 23 |
|---|---|---|---|---|---|---|---|
| SiO$_2$ (wt %) | 78.3 | 78.3 | 78.3 | 78.3 | 78.3 | 78.3 | 76.3 |
| Al$_2$O$_3$ (wt %) | 10.5 | 9.3 | 9.3 | 9.3 | 7.5 | 8.1 | 8.7 |
| B$_2$O$_3$ (wt %) | 1 | 0.6 | 0.6 | 0.6 | 0.0 | 0.2 | 0.4 |
| Li$_2$O (wt %) | 9.5 | 10.7 | 10.7 | 10.7 | 12.5 | 11.9 | 11.3 |
| Na$_2$O (wt %) | 1.7 | 1.7 | 1.7 | 1.7 | 1.7 | 1.7 | 1.7 |
| K$_2$O (wt %) | 0.0 | 0.0 | 0.0 | 0.0 | 0.0 | 0.0 | 0.0 |

TABLE 3-continued

| | | | | | | | |
|---|---|---|---|---|---|---|---|
| ZnO (wt %) | 0.0 | 0.0 | 0.0 | 0.0 | 0.0 | 0.0 | 0.0 |
| ZrO₂ (wt %) | 4.0 | 4.0 | 6.0 | 8.0 | 4.0 | 4.0 | 4.0 |
| P₂O₅ (wt %) | 3.0 | 2.0 | 2.0 | 2.0 | 2.0 | 2.2 | 2.4 |
| Ceramming cycle | 700° C.-0.5 hr/800° C.-0.5 hr | 700° C.-0.5 hr/800° C.-0.5 hr | 700° C.-0.5 hr/800° C.-0.5 hr | 700° C.-0.5 hr/800° C.-0.5 hr | 540° C.-4 hr/600° C.-4 hr/730° C.-4 hr | 540° C.-4 hr/600° C.-4 hr/740° C.-4 hr | 540° C.-4 hr/600° C.-4 hr/730° C.-4 hr |
| Phase assemblage | Petalite, lithium disilicate, lithiophosphate | Petalite, lithium disilicate, lithiophosphate | Petalite, lithium disilicate, β-quartz lithiophosphate | Petalite, lithium disilicate, cristobalite, lithiophosphate | Petalite, lithium disilicate | Petalite, lithium disilicate, β-quartz | Petalite, lithium disilicate |
| Appearance | Translucent white | Translucent white | Translucent white | Translucent white | Slight hazy, transparent | Transparent | Slight hazy, transparent |
| Liquidus temperature (° C.) | 1070 | 1060 | 1055 | 1220 | 1030 | 1050 | 1070 |
| Liquidus viscosity (poise) | 9800 | 5900 | 6100 | 880 | 3700 | 3800 | 3800 |

| Composition | 24 | 25 | 26 | 27 | 28 | 29 |
|---|---|---|---|---|---|---|
| SiO₂ (wt %) | 72.3 | 78.3 | 78.3 | 78.3 | 78.3 | 78.3 |
| Al₂O₃ (wt %) | 14.1 | 10.5 | 8.1 | 10.1 | 11.1 | 12.1 |
| B₂O₃ (wt %) | 0.2 | 1 | 0.2 | 0.2 | 0.2 | 0.2 |
| Li₂O (wt %) | 11.9 | 9.5 | 11.9 | 11.9 | 11.9 | 11.9 |
| Na₂O (wt %) | 1.7 | 0 | 0 | 0 | 0 | 0 |
| K₂O (wt %) | 0.0 | 1.7 | 1.7 | 1.7 | 1.7 | 1.7 |
| ZnO (wt %) | 0.0 | 0 | 0 | 0 | 0 | 0 |
| ZrO₂ (wt %) | 4.0 | 4 | 4 | 4 | 4 | 4 |
| P₂O₅ (wt %) | 2.2 | 3 | 2.2 | 2.2 | 2.2 | 2.2 |
| Ceramming cycle | 540° C.-4 hr/600° C.-4 hr/630° C.-4 hr | 540° C.-4 hr/600° C.-4 hr/680° C.-2 hr | 540° C.-4 hr/600° C.-4 hr/680° C.-2 hr | 540° C.-4 hr/600° C.-4 hr/680° C.-2 hr | 540° C.-4 hr/600° C.-4 hr/680° C.-2 hr | 540° C.-4 hr/600° C.-4 hr/680° C.-2 hr |
| Phase assemblage | β-quartz, petalite, lithium metasilicate | — | — | — | — | — |
| Appearance | Translucent white | Translucent white | Transparent | Transparent | Slightly hazy, transparent | Slightly hazy, transparent |
| Liquidus temperature (° C.) | — | — | — | — | — | — |
| Liquidus viscosity (poise) | — | — | — | — | — | — |

The fracture toughness of samples of glass-ceramic Compositions 17, 18, and 22 are measured using chevron notched short beam measurements. The fracture toughness is 1.2 MPa·m$^{1/2}$, 1.13 MPa·m$^{1/2}$, and 1.2 MPa·m$^{1/2}$, respectively.

Figure 20:
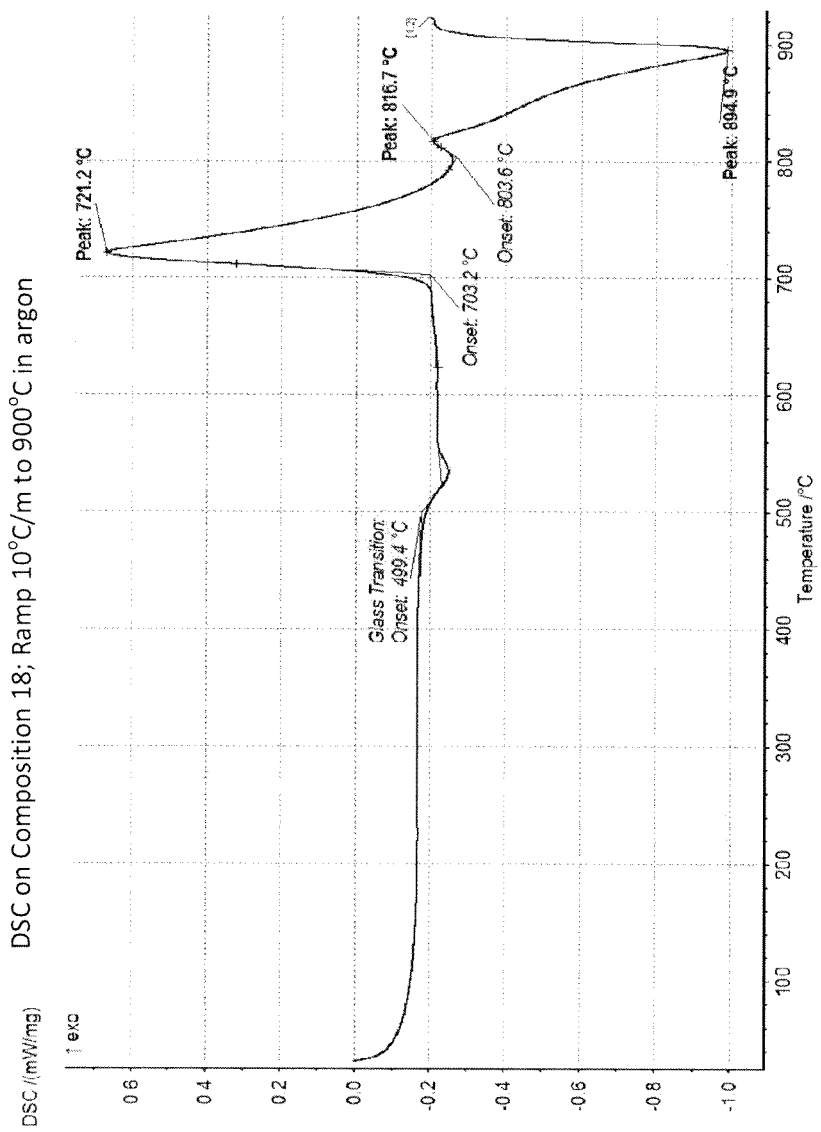
FIG. 20 is a plot of a differential calorimetry (DSC) trace for an exemplary glass-ceramic composition.
Figure 21:
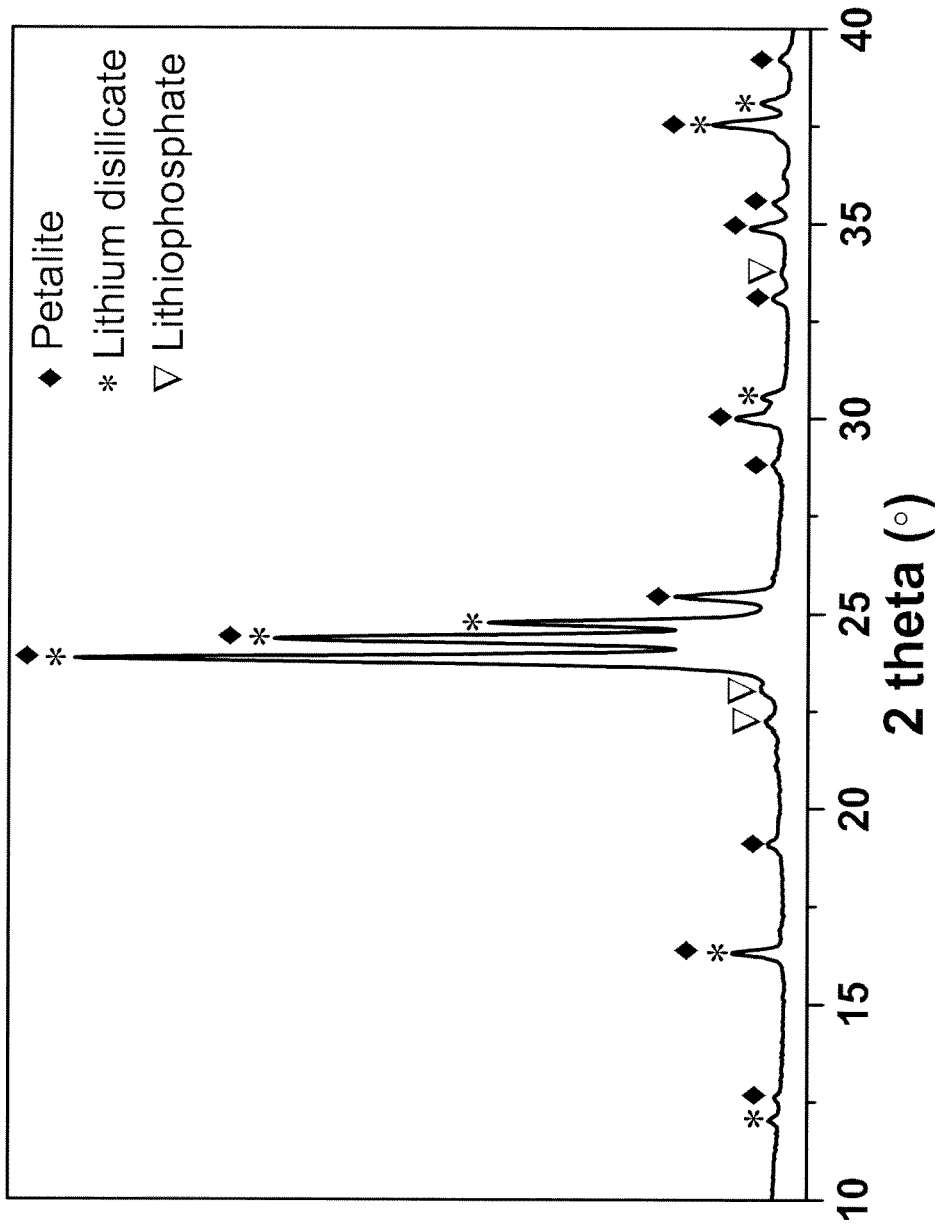
FIG. 21 shows an X-ray diffraction (XRD) spectra of the crystalline phases of an exemplary glass-ceramic composition.

As shown in FIG. 20, a differential scanning calorimetry (DSC) trace is performed for Composition 18 plotting DSC/(mW/mg) vs. temperature in degrees Celsius. FIG. 21, is an X-ray diffraction (XRD) spectra of the crystalline phases formed in Composition 18. It can be seen from the XRD spectra that petalite and lithium disilicate are the major crystalline phases.

Figure 22:
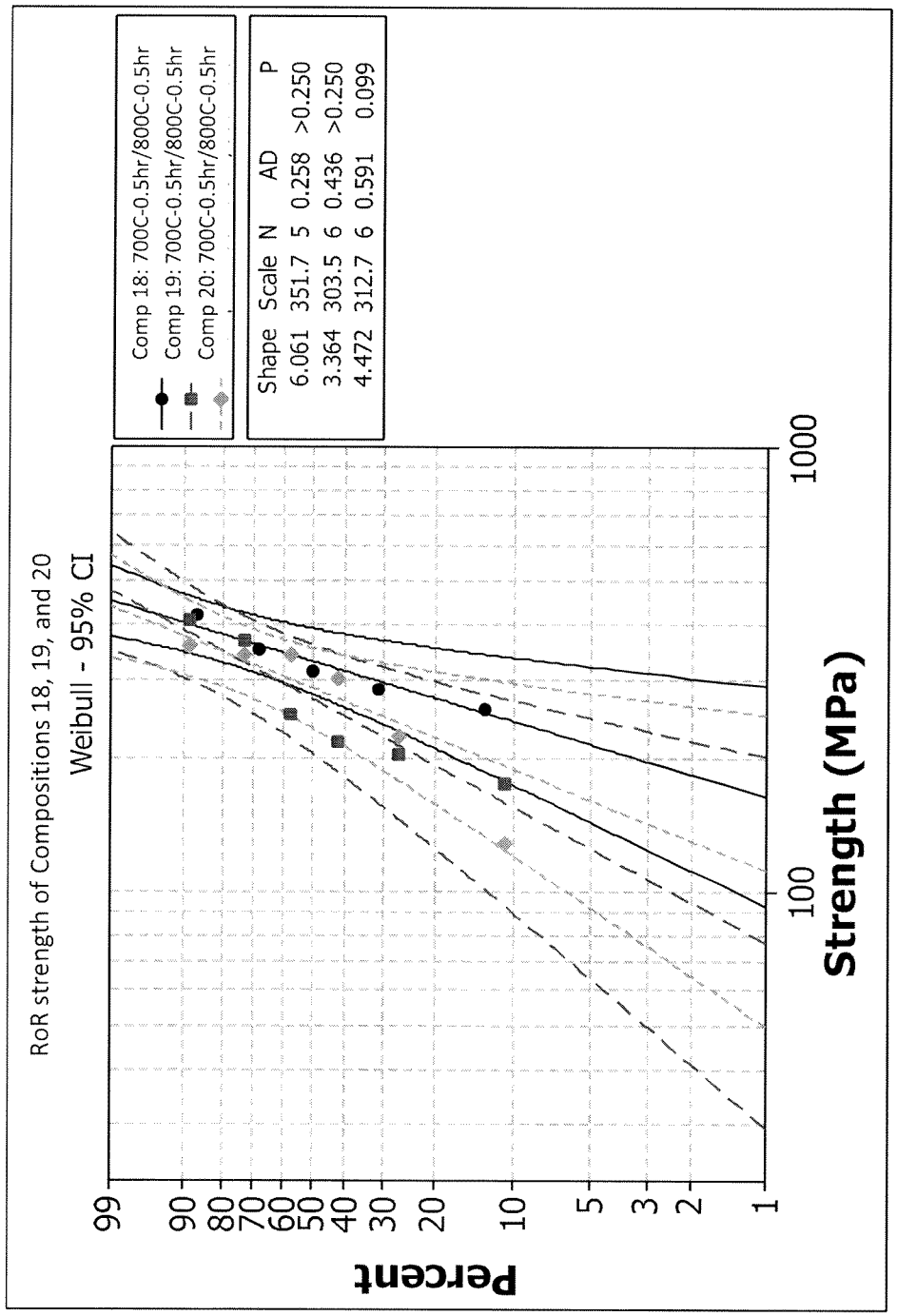
FIG. 22 shows the results of a ring-on-ring (RoR) test of an exemplary glass-ceramic composition.

50 mm by 50 mm by 1 mm samples of glass-ceramic Compositions 19, 20, and 21 are subjected to a ring-on-ring test as described above to determine the strength of the samples. FIG. 22 shows the results of the ring-on-ring test. A strength of 352 MPa, 304 MPa, and 313 MPa is achieved for the ring-on-ring test respectively. Thus, a strength of over 300 MPa can be achieved for the translucent glass ceramics disclosed herein.

Figure 23:
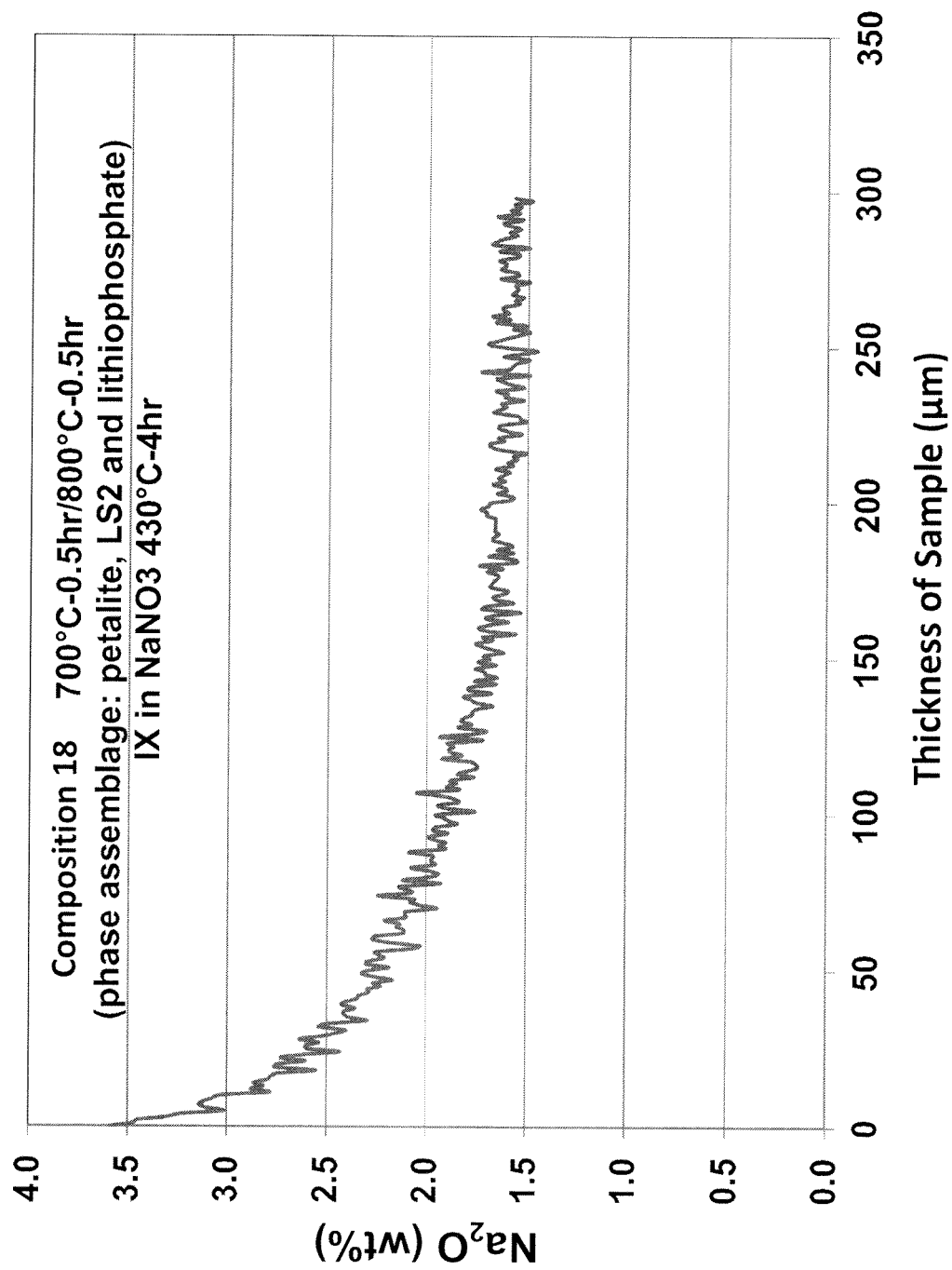
FIG. 23 shows a plot of concentration of $Na_2O$ in weight percent vs. thickness of the sample for an exemplary glass-ceramic composition.

A glass-ceramic of Composition 18 formed by batching a Na₂O concentration of 1.4 mol % into the bulk glass is subjected to an ion-exchange process wherein the sample is placed in a molten NaNO₃ bath at 430° C. for 4 hours. As shown in FIG. 23, a depth of layer of over 100 μm is achieved. FIG. 23 also shows a plot of the concentration of Na₂O in weight percent vs. thickness of the sample.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the disclosure. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the disclosure or to imply that certain features are critical, essential, or even important to the structure or function of the disclosure. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass or glass ceramic composition of the present disclosure, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

Unless otherwise specified, the concentrations of all constituents recited herein are expressed in terms of weight percent (wt %).

While embodiments and examples have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A glass-ceramic container, comprising:
   a body comprising a glass-ceramic material and a hollow interior defined by a circumferential sidewall, a top end, and a bottom end,
   wherein the circumferential sidewall comprises an average wall thickness in the range of 1 mm to 2.5 mm,
   wherein the glass-ceramic material is transparent,
   wherein the glass-ceramic material has a fracture toughness of 1 MPa*m^½ or more,
   wherein the body comprises:
      a base portion adjacent to the bottom end of the body, a spout and neck portion adjacent to the top end of the body, and a middle portion disposed between the base portion and the spout and neck portion, and
      a non-uniform wall thickness in which the average wall thickness of the middle portion is different than the average wall thickness of the base portion and/or the spout and neck portion, and
   wherein the body has an exterior surface that does not comprise a coating.

2. The glass-ceramic container of claim 1, wherein the average wall thickness of the middle portion is the range of 1 mm to 2 mm.

3. The glass-ceramic container of claim 1, wherein the body comprises radial symmetry about a central vertical axis extending from the top end of the container to the bottom end of the container.

4. The glass-ceramic container of claim 1, wherein the glass-ceramic material has an average transmittance of 70% or more in the wavelength range of 400 nm to 700 nm through a 1.0 mm thick piece of the glass-ceramic material.

5. The glass-ceramic container of claim 1, wherein the hollow interior comprises a height measured from the top end to the bottom end of the body and an average diameter defined by an inner diameter of the circumferential sidewall along the height of the body and wherein the height of the body is larger than the average diameter of the body.

6. The glass-ceramic container of claim 1, wherein the body is a single monolithic piece of glass-ceramic material.

7. The glass ceramic container of claim 6, wherein the single monolithic piece of glass-ceramic material defines an outermost surface of the glass-ceramic container and an innermost surface of the glass-ceramic container.

8. The glass-ceramic container of claim 1, wherein the body consists essentially of the glass-ceramic material.

9. The glass-ceramic container of claim 1, wherein an exterior surface of the circumferential sidewall is not under compressive stress.

10. The glass-ceramic container of claim 1, wherein an exterior surface of the circumferential sidewall is under compressive stress.

11. The glass-ceramic container of claim 1, wherein the average wall thickness of the middle portion is less than the average wall thickness of the base portion and the spout and neck portion.

12. The glass-ceramic container of claim 11, wherein the average wall thickness of the middle portion is in the range of 2 mm to 1.2 mm and the average wall thickness of the base portion and the spout and neck portion is in the range of 3 mm to 1.5 mm.

13. The glass-ceramic container of claim 1, wherein the glass-ceramic material meets Class 3 hydrolytic stability for European Pharmacopoeia 8.4 Hydrolytic Resistance Test.

14. The glass-ceramic container of claim 1, wherein the glass-ceramic material has a retained strength of at least 200 MPa in ring-on-ring testing after being statically indented with a 136 degree diamond with a 50 gram force.

15. The glass-ceramic container of claim 1, wherein the glass-ceramic material has a retained strength of at least 40 MPa in ring-on-ring testing after being dynamically indented with a 110 degree diamond at 200 mm/s with a 1 kilogram sled.

16. The glass-ceramic container of claim 1, wherein the glass-ceramic material comprises 70% or more crystalline material by volume.

17. The glass-ceramic container of claim 1, wherein the glass-ceramic material comprises a petalite crystalline phase and a lithium silicate crystalline phase, wherein the petalite crystalline phase and the lithium silicate crystalline phase have higher weight percentages than other crystalline phases present in the glass-ceramic material.

18. The glass-ceramic container of claim 17, wherein the petalite crystalline phase comprises 20 to 70 wt % of the glass-ceramic material and the lithium silicate crystalline phase comprises 20 to 60 wt % of the glass-ceramic material.

19. The glass-ceramic container of claim 17, wherein the glass-ceramic material has a composition comprising, in wt %:

$SiO_2$: 55-80%;
$Al_2O_3$: 2-20%;
$Li_2O$: 5-20%;
$B_2O_3$: 0-10%;
$Na_2O$: 0-5%;
ZnO: 0-10%;
$P_2O_5$: 0.5-6%
MgO: 0-5%; and
$ZrO_2$: 0.2-15%.

\* \* \* \* \*